United States Patent [19]
Newell et al.

[11] Patent Number: 5,371,845
[45] Date of Patent: *Dec. 6, 1994

[54] TECHNIQUE FOR PROVIDING IMPROVED USER FEEDBACK IN AN INTERACTIVE DRAWING SYSTEM

[75] Inventors: Martin E. Newell, Palo Alto; Daniel T. Fitzpatrick, Woodside, both of Calif.

[73] Assignee: Ashlar, Inc., Sunnyvale, Calif.

[ * ] Notice: The portion of the term of this patent subsequent to Jun. 16, 2009 has been disclaimed.

[21] Appl. No.: 773,171

[22] Filed: Oct. 8, 1991

Related U.S. Application Data

[63] Continuation-in-part of Ser. No. 516,004, Apr. 27, 1990, Pat. No. 5,123,087.

[51] Int. Cl.$^5$ .............................. G06F 15/60
[52] U.S. Cl. .................. 395/155; 395/133; 395/919
[58] Field of Search .............. 395/133, 135, 155, 161, 395/919; 340/721, 723, 747; 382/27, 49

[56] References Cited

U.S. PATENT DOCUMENTS

| | | | |
|---|---|---|---|
| 4,663,616 | 5/1987 | Himelstein | 340/724 |
| 4,686,636 | 8/1987 | Schrieber | 364/523 |
| 4,809,346 | 2/1989 | Shu | 382/49 |
| 4,809,347 | 2/1989 | Nash et al. | 382/49 |
| 4,813,013 | 3/1989 | Dunn | 364/900 |
| 4,829,456 | 5/1989 | Joonishi et al. | 364/522 |
| 4,852,055 | 7/1989 | Lapeyre | 364/512 |
| 4,855,939 | 8/1989 | Fitzgerald, Jr. et al. | 364/522 |
| 4,858,150 | 8/1989 | Aizawa et al. | 364/522 |
| 4,890,242 | 12/1989 | Sinha et al. | 364/518 |
| 4,905,166 | 2/1990 | Schuerman | 364/518 |
| 5,123,087 | 6/1992 | Newell et al. | 395/155 |
| 5,150,457 | 9/1992 | Behm et al. | 395/120 |

OTHER PUBLICATIONS

Sutherland, I., Sketchpad: A Man-Machine Graphical Communication System, Proceedings—Spring Joint Computer Conference, 1963.

Bier, E., Snap-Dragging, SIGGRAPH '86 Proceedings, vol. 20, No. 4, Aug. 18–22, 1986.

James Henry Clark, "3-D design of free-form B-spline surfaces," Computer Science, University of Utah, Salt Lake City, Utah 84112, UTEC-CSc-74-120, Sep. 1974, List of Issustrations iv, Abstract v, Chapter I–IV, pp. 1–62, References, pp. 63–74, Acknowledgements, p. 75, and Form Dd1473, p. 76.

MiniCad+user manual, pp. 1.2 in Preface, 2.7 in Basics chapter, 3A.33 (palette tools), and 3G.7–3G.12 (Diehl Graphsoft 1988).

Eric A. Bier, "Snap-Dragging: Interactive Geometric Design in Two and Three Dimensions," Xerox PARC Technical Report EDL-89-2 (Sep. 1989). Also available as Report No. UCB/CSD 88/416, Apr. 28, 1988, Computer Science Division, Department of Electrical Engineering and Computer Science, University of Calif., Berkeley, Calif. 94720

*Primary Examiner*—Mark K. Zimmerman
*Assistant Examiner*—Anton Fetting
*Attorney, Agent, or Firm*—Townsend and Townsend Khourie and Crew

[57] ABSTRACT

System and methods for the creation of graphic images include automatic pull-off creation and maintenance of tangent and perpendicular lines, creation and maintenance of objects satisfying mutual geometric relationships, the identification and processing of visual intersections, and alignment in 3D space. Other techniques of the present invention include the automatic recognition of interesting points, the use of screen messages to identify points, the use of a secondary cursor, the creation of temporary geometry, the examination of interesting points which arise from actual geometry, temporary geometry, and/or the interaction of actual and temporary geometry, and precise graphic operations (e.g., drawing and transformations) with the assistance of interesting points.

94 Claims, 33 Drawing Sheets

TECHNIQUE FOR PROVIDING IMPROVED USER FEEDBACK IN AN INTERACTIVE DRAWING SYSTEM

The present invention is a continuation in part of application Ser. No. 516,004 filed on Apr. 27, 1990, now U.S. Pat. No. 5,123,087 the disclosure of which is incorporated herein by reference.

BACKGROUND OF THE INVENTION

The present invention relates generally to drawing programs and computer-aided drafting/designing (CAD/CADD) systems and, more particularly, to precise cursor positioning and screen feedback techniques for creating and manipulating graphic objects.

Computers have become a powerful tool for the rapid and economical creation of pictures. The use of computer graphics is particularly well suited for automating designing and drafting techniques. CAD is like a word processor for drawings. Instead of pen and paper, the CAD user employs a computer keyboard and a mouse, light pen, digitizer tablet, or some other pointing device to create an electronic description of a drawing in the computer's memory. This image is displayed on a monitor and stored on a disk. When the user is satisfied with a drawing, he or she obtains a "hardcopy" by sending the stored image to an output device such as a plotter.

In CAD, one creates an illustration by combining basic geometric objects such as points, lines, and arcs. Each object has a precise mathematical definition facilitating storage in the computer. This also allows the computer to perform complex manipulations and test relations between objects. For example, when an object's dimensions are specified to the computer, the user can view any side of the object to see how it will look after construction.

In drafting, it is often necessary to maintain precise geometric relationships between various objects in a drawing. The draftsman's hand can rarely, if ever, achieve the mathematical precision that is available with CAD systems. However, to take advantage of this precision, the user must accurately communicate to the computer what is to be drawn.

Ordinarily, the user draws by entering, either by keyboard or pointing device, the location of an object's "control points." For example, if the user wants to draw a line (line segment), he or she types in or points to the starting and end points. The computer then displays a line defined by these control points. Alternatively, the computer can infer control points from what the user enters. For example, the user may enter a start point, length, and angle. From this input, the computer calculates the second control point before displaying the line.

Neither input method is perfect. While keyboard entry allows for the precise input of most geometric objects, it is usually not the most efficient means by which the user may communicate with a computer. For example, it would be a tedious task, at best, to draw the entire floor plan of a simple house by keyboard entry. Entering locations with a pointing device, while much faster, relies too much upon the skill of the user for accuracy. As a result, there is much interest in developing techniques by which CAD users may efficiently communicate with computers without sacrificing precision.

Sutherland describes a positioning technique based upon the use of a light pen (Sutherland, Sketchpad: A Man-Machine Graphic Communication System, Proceedings-Spring Joint Computer Conference, 1963). The Sutherland Sketchpad system allows a user to communicate rapidly with a computer through the medium of line drawing.

Recognizing that typed statements were a cumbersome way to describe the shapes of complex objects, the Sketchpad system uses a light pen for the placement of a drawing cursor. To compensate for the inaccuracy created by freehand pointing, the exact location of the light pen is ignored in favor of a "pseudo-pen" location which is exactly on an object aimed at. In other words, if the light pen location is sufficiently close to an object, the computer assumes that the user wants to point to that object. If no object is aimed at, the pseudo-pen location and actual pen location are identical. Thus, the Sketchpad system compensates for a user's imprecise cursor placement by constraining or snapping control points onto an existing object.

Bier discloses the use of "gravity active" points and "alignment objects." See, Bier, Snap Dragging, SIGGRAPH '86 Proceedings, Volume 20, No. 4, Aug. 18–22, 1986, 233–240. Bier's system uses a "caret" as the source of precision. The caret is distinct from the cursor: the cursor always moves with the mouse while the caret can stray from the cursor and "snap" to a gravity object which attracts it. When a control point is added to an illustration, it is always positioned at the location of the caret.

Typical two-dimensional (2D) drafting systems describe points in terms of x and y coordinates (Cartesian coordinate system). Three-dimensional (3D) drafting systems, however, accept x, y, and z coordinates, thereby allowing the representation and display of objects from different viewing directions. A 3D system is preferable since, in many design applications, the draftsman must describe a three-dimensional object.

3D capabilities stretch CAD to encompass the properties that distinguish real objects from imaginary 2D projections. A 3D wire-frame model may represent an object as a see-through collection of lines and curves in 3-axis coordinate space. A 3D surfaced model represents the same model as a collection of bounding surfaces. The final 3D solid model represents an object as a mathematical solid. As compared to 2D systems, 3D models are easily converted to shaded images that give the draftsman an idea of what the final product will look like. 3D CAD systems can also be used to calculate mechanical properties of objects such as volumes, weights, centers of gravity, and moments of inertia.

While prior systems offer certain advantages over two-dimensional techniques, these systems completely ignore other "interesting" points which arise in 3D space from user-created geometries. In particular, prior art systems ignore interesting points which arise from user created geometries in different planes. With respect to two-dimensional techniques, prior systems also ignore the use of a plurality of interesting points as a means of constraining user-created geometries. The invention recognizes these shortcomings and provides novel methods and apparatus which fulfill these and other needs.

SUMMARY OF THE INVENTION

According to the present invention, precise cursor positioning and screen feedback techniques for creating and manipulating graphic objects are provided. Techniques of the present invention include: (1) the automatic creation and maintenance of tangent and perpendicular lines; (2) the creation and maintenance of graphics objects satisfying mutual geometric constraints, including mutual tangents, mutual perpendiculars, and mutual tangent/perpendicular; (3) the automatic recognition and processing of visual interesting points; and (4) alignment in 3D space. In addition to the foregoing techniques, the present invention also provides for the use of screen messages, the addition of a secondary cursor, the creation of temporary geometry, the examination for interesting points which arise from actual geometry, temporary geometry, and/or the interaction of actual and temporary geometry, and precise graphic operations (e.g., drawing and transformations) which are accomplished with the assistance of interesting points.

In the "automatic pull-off" method of the present invention a tangent or perpendicular is automatically created when the user pulls off (drags the mouse away from) a curve or line while in line drawing mode. A tangent line is created by pulling off in a more tangent direction; a more perpendicular pull-off creates a perpendicular line.

The "mutual tangent/perpendicular" method of the present invention allows the user to draw a line which is constrained at each end simultaneously by different interesting points (typically tangents and perpendiculars). Thus when drawing a line or other graphic object, the present invention allows the processing of two relationships simultaneously.

A third method of the present invention is the locating of "visual intersections," i.e., the intersections (interesting points) of one object with another object that is visually in front or behind. While the mapping of a three-dimensional figure to a two-dimensional display may create new "intersections" which are not true intersections in 3D space, these visual intersections are nonetheless interesting points which the user may interact with. According to the present invention, therefore, visual intersections are recognized as interesting points which are accessible to the user.

A fourth method of the present invention is alignment in 3D space. Specifically, alignment to interesting points is recognized not only in x (horizontal) and y (vertical) directions, but also in the z (depth) direction.

DESCRIPTION OF THE PREFERRED EMBODIMENT

Introduction

Figure 1:
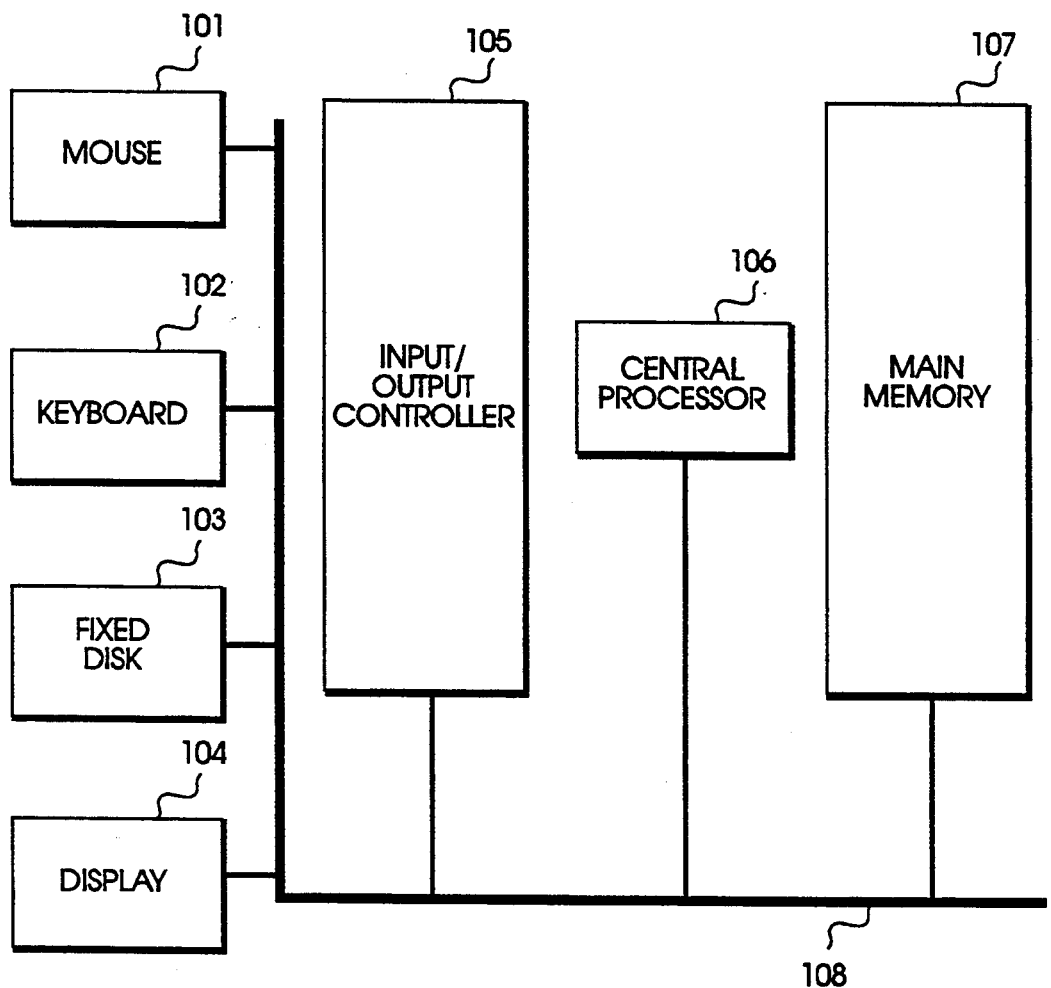
FIG. 1 is a simplified functional block diagram of a computer system in which the present invention may be embodied.

The invention may be embodied on a computer system such as the system 100 of FIG. 1, which comprises a mouse 101, a keyboard 102, a fixed disk 103, a display monitor 104, an input/output controller 105, a central processor 106, and a main memory 107. The various components communicate through a system bus 108 or similar architecture. The user enters commands through keyboard 102 and/or mouse 101; the computer displays the image through display monitor 104, such as a cathode ray tube or a printer. In the preferred embodiment, an appropriately programmed Macintosh personal computer (Apple Computers, Cupertino, Calif.) is used.

In this interactive CAD system, the user constructs objects on the display monitor 104 with the mouse 101. The system emulates the drawing tools which are typically available to the draftsman, such as a compass, a ruler, a technical pen, a french curve, and a transfer screen. Each drawing is constructed from geometric objects which have precise mathematical definitions and, thus, are represented in the computer's memory 107. To draw a line, for example, one need only specify its starting and end points. Likewise, a circle is constructed by specifying its center and a point on the circle. The accurate placement of these "control points" is crucial for the creation of geometric objects in CAD systems.

The ability to illustrate objects by the placing of control points allows the user to create illustrations with the mathematical precision of a computer. Prior systems, however, concentrate on constraining control points to lie on either a prior-drawn object or on some type of grid. These systems ignore the geometrically "interesting points" that the user may wish to interact with.

The present invention recognizes that there are many types of interesting points which one needs for efficient designing and drafting and, therefore, provides a geometric inference engine which automatically locates these points. Interesting points are any geometric entity, parameter, or location which is of interest to the draftsman; types include midpoints, endpoints, intersections, vertices, tangents, perpendiculars, arc centers, and arc quadrant points. In addition to locating these points automatically, the system also indicates the exact nature of each and how it is found.

Additionally, novel screen feedback techniques are provided to augment the utility of interesting points. In particular, the geometric inference engine is provided with a secondary cursor to further increase drawing accuracy. The secondary cursor gives the user a preview of where the actual cursor's position will map to when a control point is placed. The actual cursor need not be exactly at an "interesting location" to find interesting points. Instead, the secondary cursor is allowed to snap to the interesting point (or temporary geometry, if applicable) while the actual cursor maintains its current position. In other words, when the actual cursor is within the "hit radius" of an interesting location, the system may display and select interesting points without disrupting the position of the actual cursor. In operation, as the user moves the mouse, the system locates nearby interesting point by examining all geometries close to the cursor. If there is a best interesting point nearby, the system displays it to the user by drawing an "X" (secondary cursor) over it, with a message of how the point was found. This technique allows even the novice user to interact precisely with interesting points.

Figure 2A:
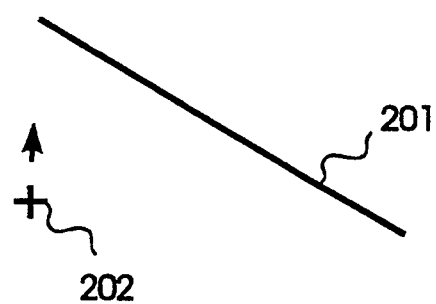
FIGS. 2A-B illustrate a simple example of locating an interesting point, the end point for a line.
Figure 2B:
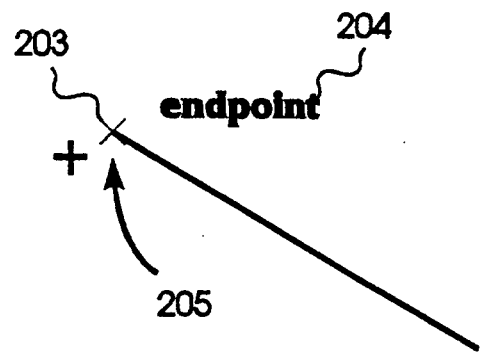

FIGS. 2A-B illustrate a simple case of locating an interesting point using the inference engine of the present invention. In FIG. 2A, the cursor 202 is not near any interesting points. However, once the cursor 202 moves sufficiently close to the end of the line 201, an interesting point is identified. As seen in FIG. 2B, the secondary cursor 203 snaps to the line's endpoint 205 and the message "endpoint" 204 is displayed. The system performs this detection automatically, i.e., without any additional user action.

Prior systems provide minimal, if any, support for interesting points. For example, to interact with even the simplest type of interesting point, such as a midpoint, the user must enter a series of commands. Typically, the user must first select an object or group of objects. Then he or she must specify the type of the interesting point. Only after completing these steps, may the user interact with the point sought. Screen feedback is minimal. Moreover, the set of interesting points available in these systems is very limited—the user may select only those points which are intrinsic to the object or objects drawn.

In the present invention, the locating of nearby interesting points is merely the initial inquiry of the geometric inference engine. If the system does not find an interesting point, it generates more geometry to see if this creates new interesting points. An example best demonstrates this feature.

Figure 3A:
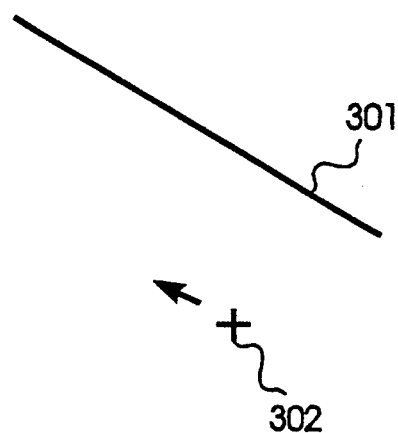
FIGS. 3A-B illustrate the creation of new interesting points from the construction of temporary geometry.
Figure 3B:
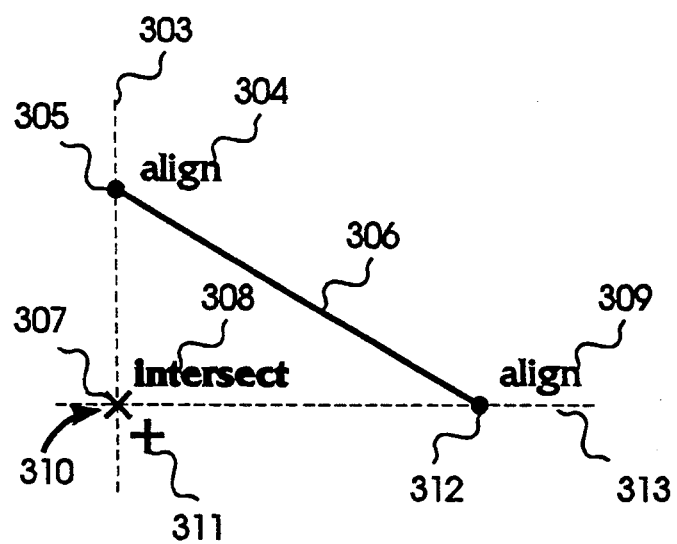

FIGS. 3A-B illustrate the construction of temporary geometry by the system to create new interesting points. In FIG. 3A, as the cursor 302 moves no interesting points are encountered. Specifically, cursor 302 is not near any interesting points, such as endpoints or midpoint, which lie on the line 301.

In FIG. 3B, the system generates additional geometry by creating temporary construction lines 303, 313. These lines 303, 313 are termed "temporary geometry" to distinguish them from existing objects or actual geometry (e.g., line 306). The intersection 310 of these lines 303, 313 is near the location of the cursor 311.

The system recognizes this intersection 310 of temporary geometry as an interesting point. It indicates this to the user by snapping the secondary cursor 307 onto the intersection 310 and displaying the "intersect" message 308. As FIG. 3B indicates, this interesting point 310 is aligned vertically and horizontally with the endpoints 305, 312 of the existing line 306. Furthermore, the reason for the generation of the temporary construction lines is indicated by displaying "align" messages 304, 309 proximal to the endpoints 305, 312 which caused their creation.

These simple examples provide an introduction to interesting points and serve as a foundation upon which more complex geometries may be illustrated. It is apparent that interesting points are inherent to a geometric object, such as an endpoint, midpoint, or center, or they arise from the generation of temporary geometry. In the latter case, the system constructs temporary geometric objects which themselves are examined for interesting points. The system uses two basic objects—lines and circles—to construct temporary geometry. Each of these will now be examined in greater detail.

Figure 4A:
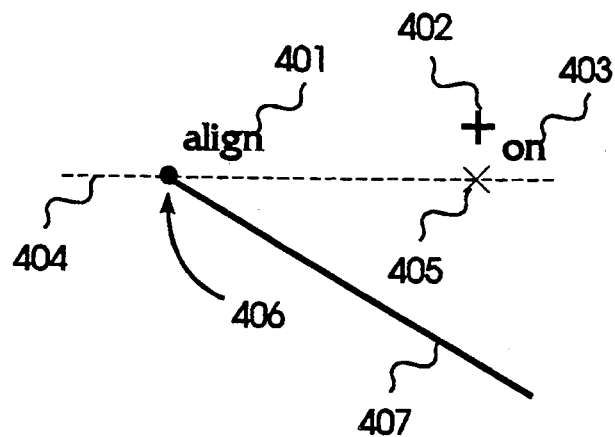
FIGS. 4A-B illustrate the use of temporary construction lines to maintain precise angular relationships for normal creation angles.
Figure 4B:
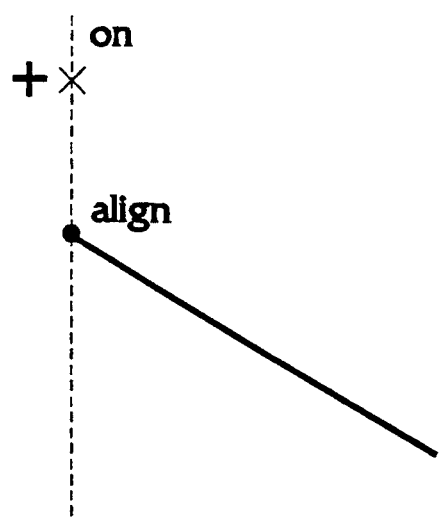
Figure 5A:
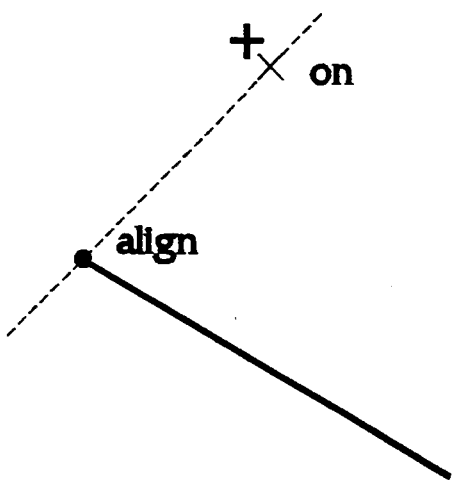
FIGS. 5A-B illustrate the use of temporary construction lines to maintain precise angular relationships for additional creation angles.
Figure 5B:
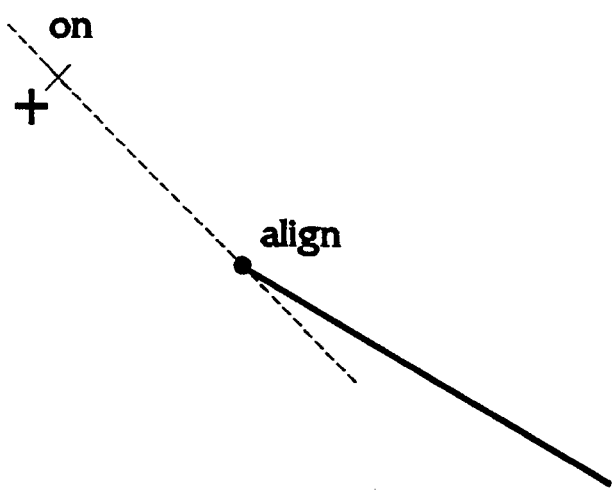

The creation of temporary construction lines allows for several geometric relationships to be tested. As seen in FIGS. 4A-B, one use for temporary construction lines is to maintain precise angular relations ("normal creation angles"). FIG. 4A illustrates the construction of a temporary construction line 404 at 0° relative to the endpoint 406 (interesting point) of an existing line 407. The "align" message 401 indicates to the user the reason for the creation of the temporary construction line 404. The "on" message 403 indicates that the secondary cursor 405 now lies on the temporary construction line 404. FIG. 4B illustrates the creation and display of a temporary construction line for 90°. FIGS. 5A-B illustrate "additional creation angles" for other angles (e.g., 60° and 120°).

Temporary construction lines are also useful for finding tangents, perpendiculars, and even angles in between tangents and perpendiculars. By way of illustration and not limitation, the user may wish to construct a line which lies tangent to an existing curve (ellipses, circles, arcs, and lines).

Figure 6A:
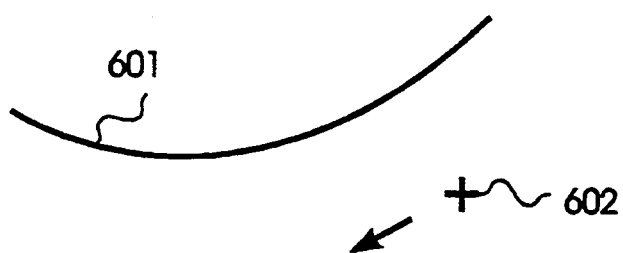
FIGS. 6A-C illustrate the use of temporary construction lines to find tangents.
Figure 6B:
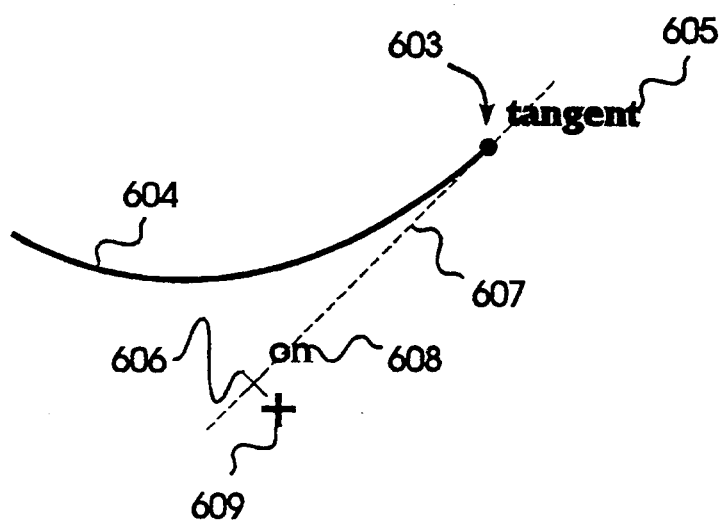
Figure 6C:
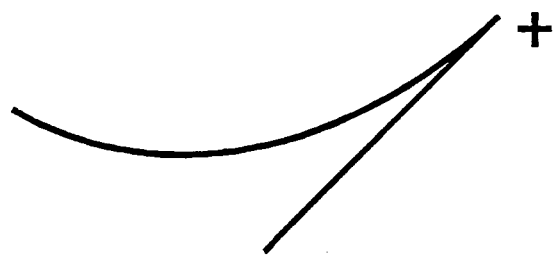

FIGS. 6A-C illustrate this interaction. FIG. 6A represents the cursor 602 as it moves towards an interesting point of the arc 601. In FIG. 6B, as the cursor 609 passes by the arc 604, the geometric inference engine recognizes that the user may want to access the tangent from the arc's endpoint 603. In other words, the system recognizes that the cursor 609 is approaching an imaginary tangent from the endpoint 603. In response, the system creates the temporary construction line 607 and displays the "tangent" message 605. The secondary cursor 606 snaps onto the temporary construction line 607; juxtaposed is the "on" message 608 indicating that a control point, if placed now, would lie on the temporary construction line 607. FIG. 6C represents the completed illustration where the user has drawn a line to the arc's endpoint.

Those skilled in the art will appreciate other screen messages within the scope of the present invention. For example, a set of screen messages may be selected for a particular language, e.g., English, Spanish, French, German, Russian, and the like. Alternatively, screen messages may be in the form of graphics, such as icons and bitmaps. For example, a tangent may be represented by an icon of a circle with a tangent line. Perpendicular may be represented by an icon of two lines perpendicular to one another.

Figure 7A:
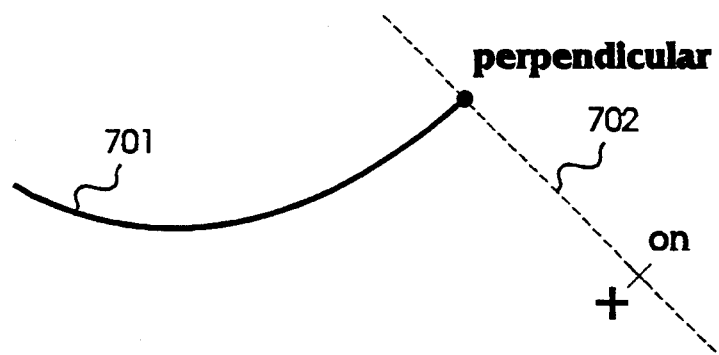
FIGS. 7A-B illustrate the use of temporary construction lines to find perpendiculars.
Figure 7B:
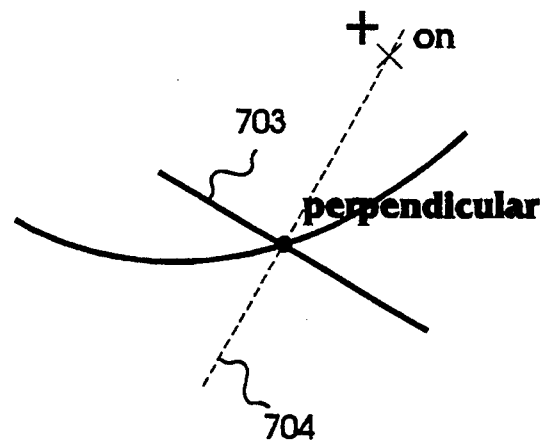
Figure 7C:
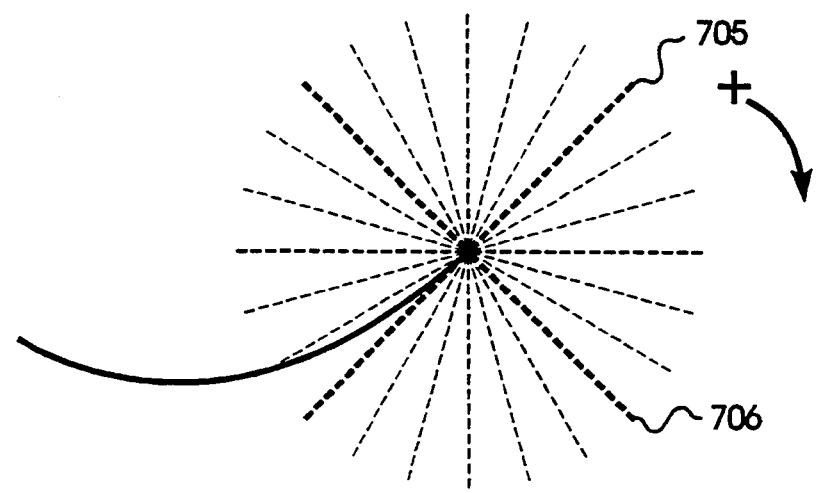
FIG. 7C illustrates the use of temporary construction lines to find angles in between a tangent and a perpendicular.

In a similar manner, the system locates perpendiculars. FIG. 7A exemplifies locating a perpendicular 702 for an arc 701, while FIG. 7B shows a perpendicular 704 for a line 703. Furthermore, the geometric inference engine can locate any angle in between a tangent and a perpendicular. In FIG. 7C, for example, angles located between the tangent 705 and the perpendicular 706 are found.

Figure 8A:
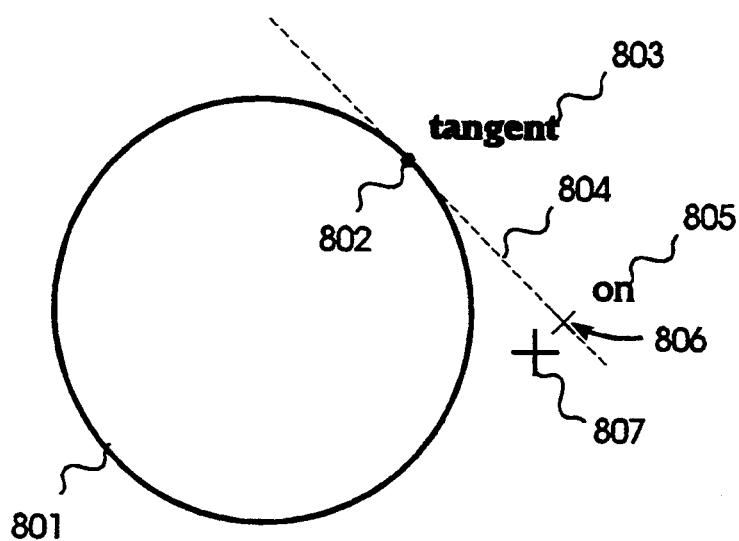
FIG. 8A illustrates the use of a temporary construction line to draw a tangential line.

FIG. 8A illustrates the locating of a tangent from any given point on a circle. The user clicks (enters with the mouse) a point 802 on the circle 801, for example, to place the first control point for a new line. This point 802 becomes the current point. As the cursor 807 approaches the tangent for the circle 801 at the current point 802, a temporary construction line 804 is displayed along with the "tangent" message 803. The secondary cursor 806 migrates onto this line 804; a confirmatory "on" message 805 is displayed.

Figure 8B:
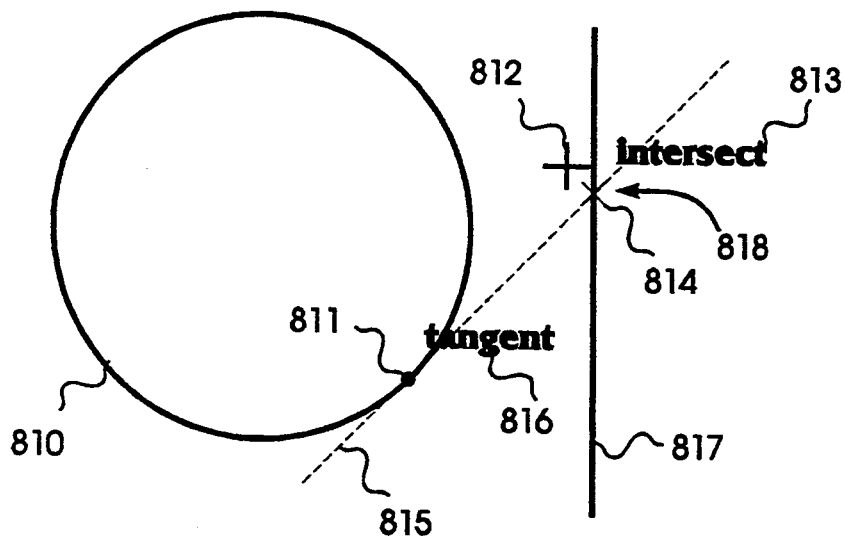
FIG. 8B illustrates the interaction of a temporary construction line (from one object) with an object of actual geometry (another object).
Figure 9A:
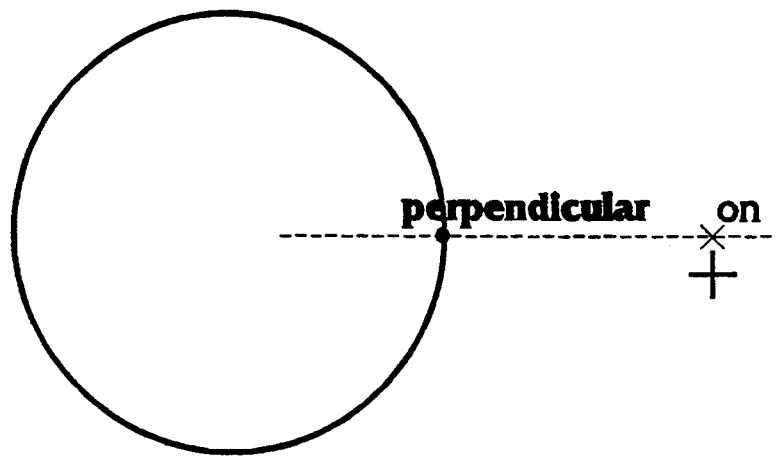
FIG. 9A illustrates the locating of a perpendicular from any given point on a circle.
Figure 9B:
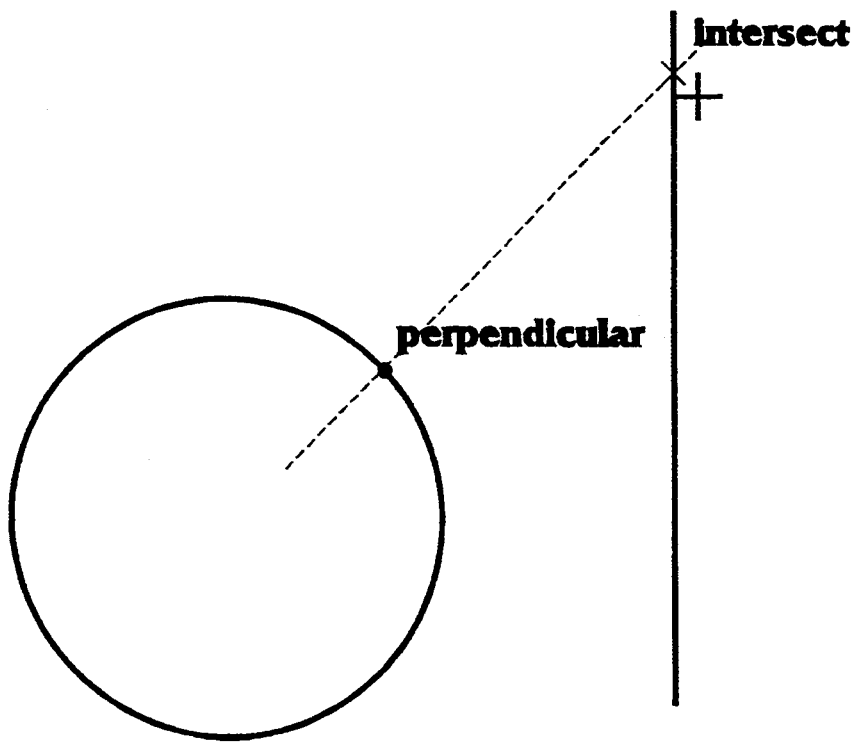
FIG. 9B illustrates the interaction of temporary geometry (perpendicular temporary construction line) with another object of actual geometry.

FIG. 8B illustrates this concept for multiple objects. The user enters a point 811 on the circle 810. The point 811 is now the current point. When the cursor 812 approaches the tangent for the circle 810 at the current point 811, a temporary construction line 815 is displayed along with "tangent" 816. However, in this case, the cursor 812 is also near the intersection 818 of the line 817 with the temporary construction line 815. The geometric inference engine identifies this by placing the secondary cursor 814 on the intersection 818 and displaying the screen message "intersect" 813. Thus, a temporary construction line, once created, may interact with another existing object to create additional interesting points (e.g., intersection 818). FIGS. 9A-B illustrate similar examples for perpendiculars.

The use of the geometric inference engine to automatically locate and interact with other interesting points, for example, offsets, grid points, and vanishing points, is disclosed in copending application Ser. No. 516,004, assigned to the assignee of the present application.

Tangents/Perpendiculars: Automatic Pull-off and Mutuals

In addition to automatically locating tangents and perpendiculars for curves, the present invention provides two additional techniques for the creation and editing of tangents and perpendiculars. The first technique, "automatic pull-off," automatically establishes a desired geometric relationship (tangent or perpendicular) when the user pulls off (drags the mouse away from) a curve while in line drawing mode. In a preferred embodiment, a tangent line is created by pulling off in a tangent direction; a perpendicular pull-off creates a perpendicular line.

The second technique is "mutual" geometric relationships; in a preferred embodiment, this technique includes mutual tangents/perpendiculars. This allows the user to draw a line which is constrained at each end simultaneously by different interesting points (e.g., tangents and perpendiculars). Both techniques are best illustrated by examples.

Figure 10A:
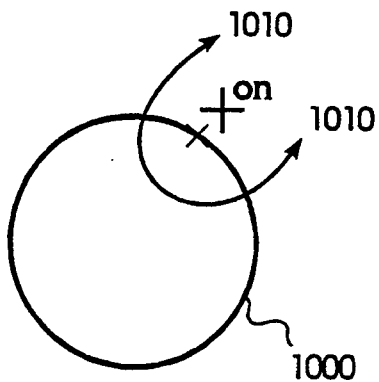
FIGS. 10A-E illustrate the method of automatic pull-off for the creation of tangent lines.
Figure 10B:
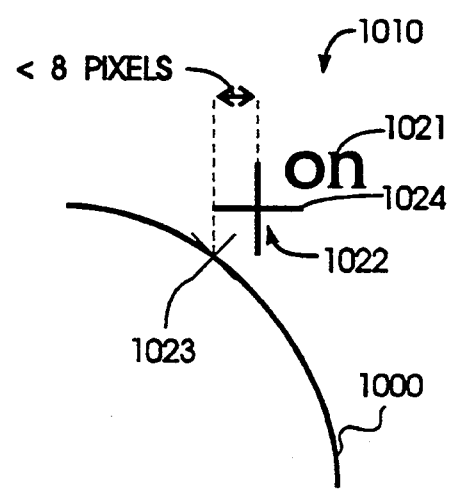

Referring to FIGS. 10A-E, the operation of automatic pull-off is illustrated. In FIG. 10A, the user has created a circle 1000. Referring to FIG. 10B, an enlarged section 1010 of circle 1000 is shown. A cursor 1024 located at point 1022 is within a specified range or hit radius of circle 1000. Thus, secondary cursor 1023 is displayed, indicating the location on circle 1000 where a control point would lie if now placed, and the message "on" 1021 is displayed. At this point in time, the user has not "pulled off" cursor 1024. In other words, the user has not dragged cursor 1024 the minimum distance necessary to invoke the automatic pull-off feature. The minimum distance necessary equals at least one pixel and, more preferably, a plurality of pixels. In a preferred embodiment, the user must pull-off at least 8 pixels.

Figure 10C:
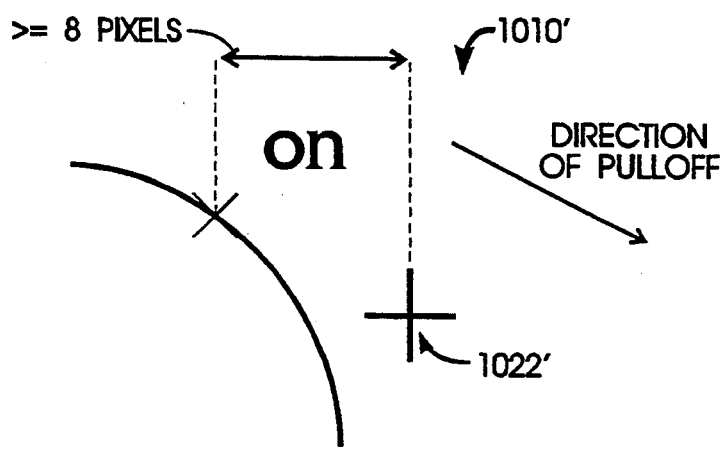
Figure 10D:
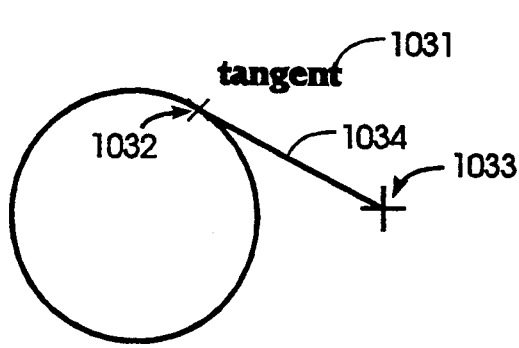
Figure 10E:
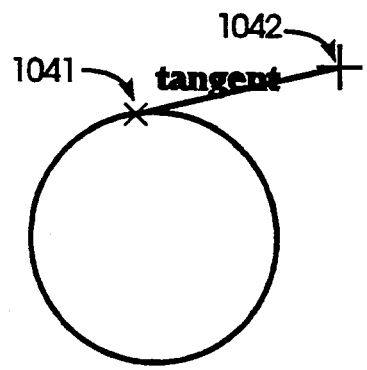

Referring to FIG. 10C, if cursor 1022 is dragged (moved away) from circle 1000 in a tangential direction (e.g., to point 1022') while the system is in line drawing mode, a tangent line is automatically created. FIG. 10D illustrates the completed operation. Cursor 1024 has moved to location 1033, thus a tangential line 1034 is automatically generated between the pull-off point 1032 (start point) and the end point 1033. The message "tangent" 1031 is displayed as feedback indicating the nature of the geometry created. Referring to FIG. 10E, if cursor 1024 is now moved to a new location 1042, the start point on circle 1000 changes to new location 1041 thus maintaining the tangential relationship.

Those skilled in the art will appreciate that any geometric relationships may be automatically created within the scope of the present invention. In addition to tangents and perpendiculars, the inference engine of the present invention may automatically create a bisecting line, e.g., bisecting the tangent and perpendicular points of a given object. Thus, the pull-off technique of the present invention is not limited to any particular set of geometric relationships.

Figure 10F:
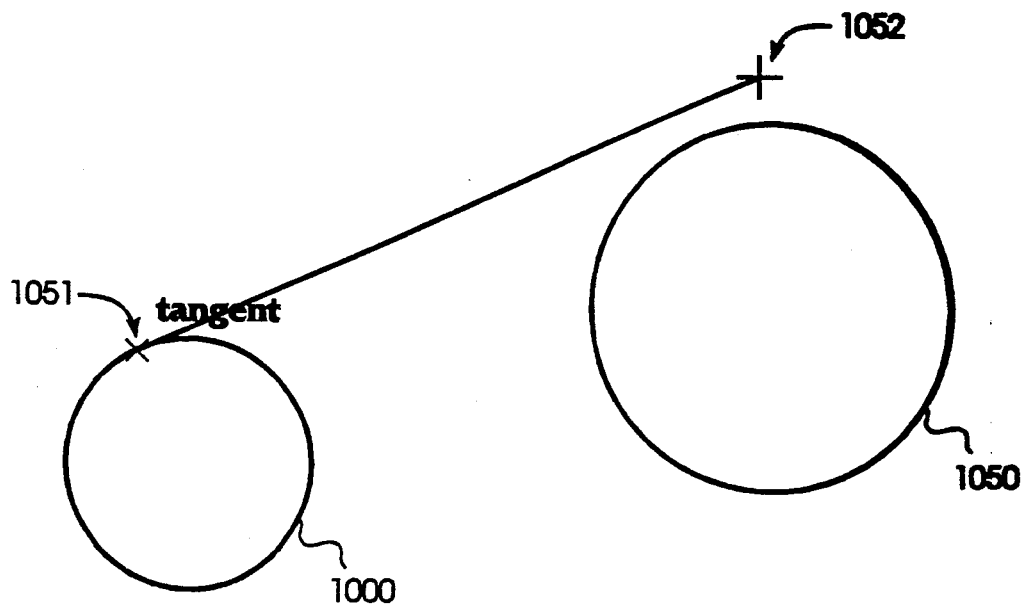
FIGS. 10F-J illustrate the operation of mutual tangents/perpendiculars.

Referring to FIGS. 10F-J, the general concept of mutual tangents is introduced. In FIG. 10F, the cursor 1024 has moved to location 1052 while maintaining tangency to circle 1000, i.e., the start point from the first circle 1000 has shifted to location 1051 to maintain the tangent relationship of the line being created. Since the second circle 1050 is not yet within the hit radius of the cursor, it does not interaction at this point. In this example, the line being created is constrained only at its start point, its end point freely following the cursor.

Figure 10G:
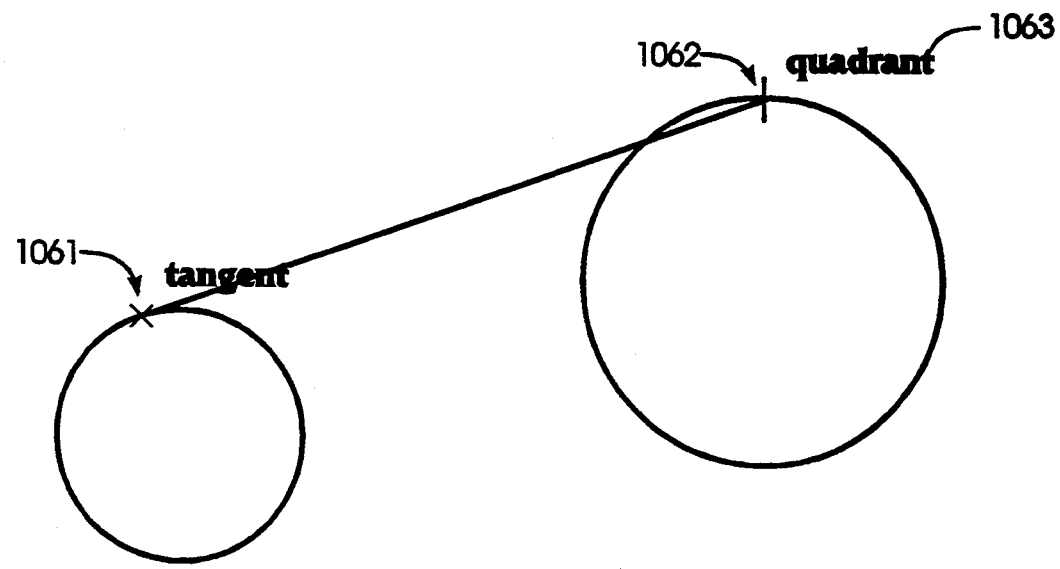

Referring to FIG. 10G, as the cursor approaches the quadrant or extreme point 1062 of the second circle 1050, cursor 1024 snaps onto that interesting location and the message "quadrant" 1063 is displayed. Simultaneously, a tangential relationship is maintained at the first circle 1000 with the start point now located at point 1061. In this example, the line being created must satisfy two constraints—a tangency to circle 1000 and a quadrant point at circle 1050.

The foregoing example requires the geometric inference engine to process one relationship (tangent) and one point (quadrant). In particular, once the quadrant point on the second circle 1050 is located, the tangent to the first circle 1000 may then be located.

Figure 10H:
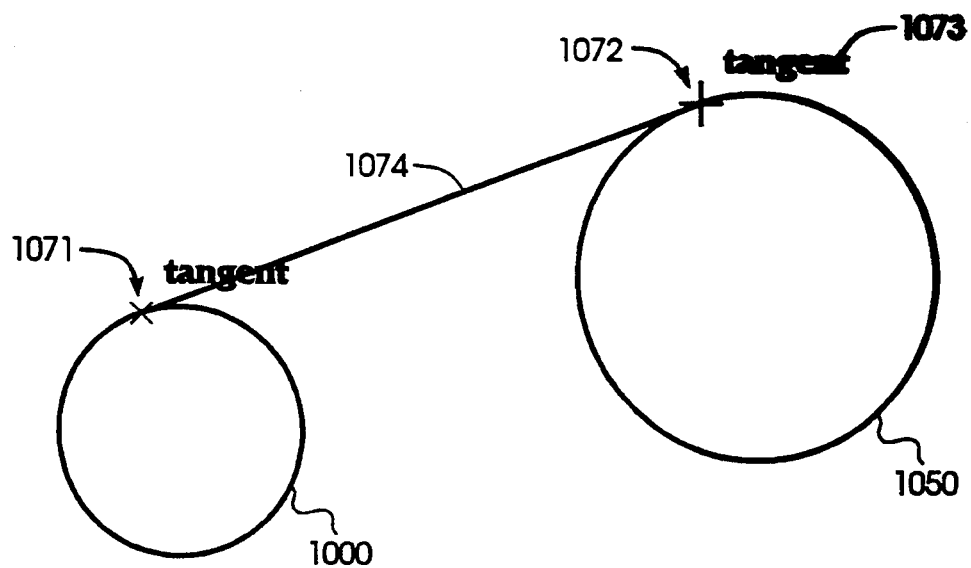

A far more difficult task, however, is to process two relationships simultaneously, such as mutual tangents. FIG. 10H illustrates this problem. As the cursor snaps onto the tangent of the second circle 1050 at location 1072, the start point on the first circle 1000 shifts to location 1071 to maintain tangency. However, this shift changes the geometric relationship of line 1074 to the second circle 1050. In particular, line 1074 is no longer tangent to the second circle 1050. Thus, the end point must shift to re-establish the tangency to the second circle 1050. Again, a shift at one end of line 1050 impacts the geometric relationship at the other end. In this case, a shift at the end point causes line 1050 to lose its tangent relationship with the first circle 1000. Using the techniques of the present invention described hereinbelow, however, the geometric inference engine is able to satisfy these and other mutual conditions. After locating the mutual tangents, user feedback is provided with the message "tangent" 1073.

Figure 10I:
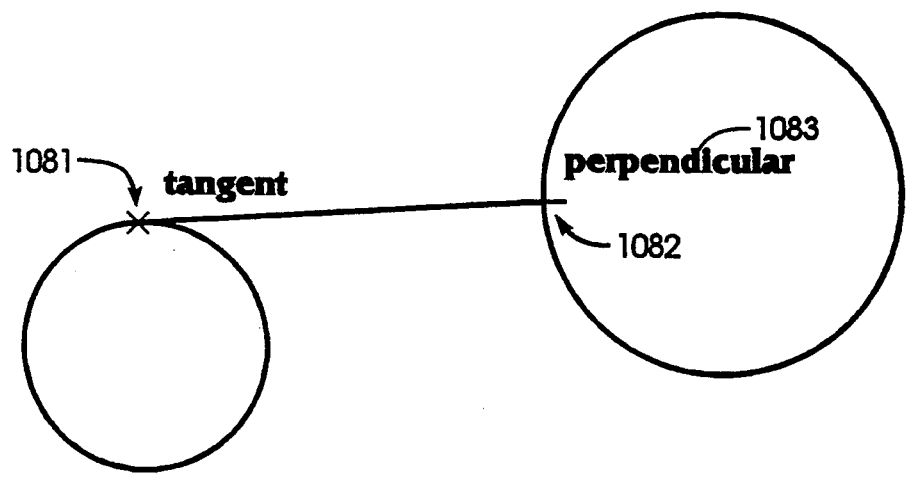
Figure 10J:
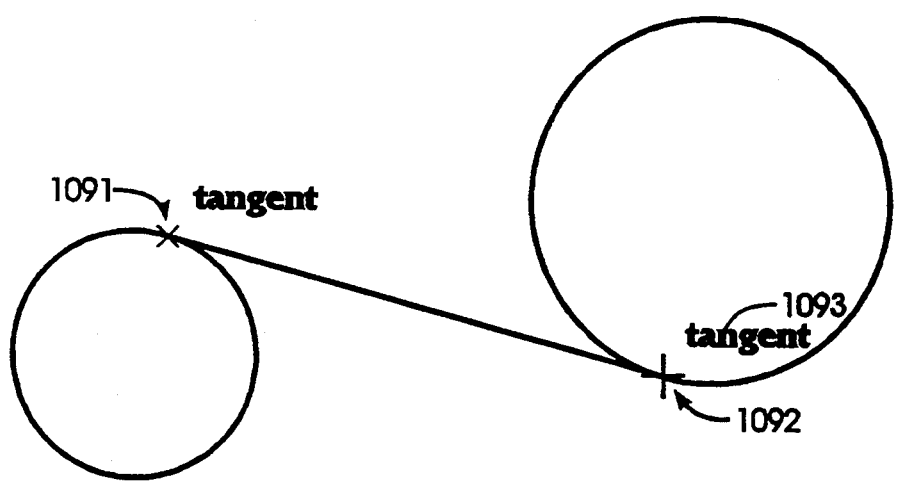

FIGS. 10I–J illustrate additional examples. In FIG. 10I, the cursor has moved to a perpendicular of circle 1050. When the cursor snaps onto the perpendicular point 1082, the start point on circle 1000 shifts to a new location 1081. Again, dual geometric relationships must be satisfied. As user feedback, the new message "perpendicular" 1083 is displayed. If the user continues the movement of the cursor downward, as shown in FIG. 10J, another tangent of circle 1050 is located at point 1092. The start point shifts to location 1091, and "tangent" 1093 is displayed.

Figure 11A:
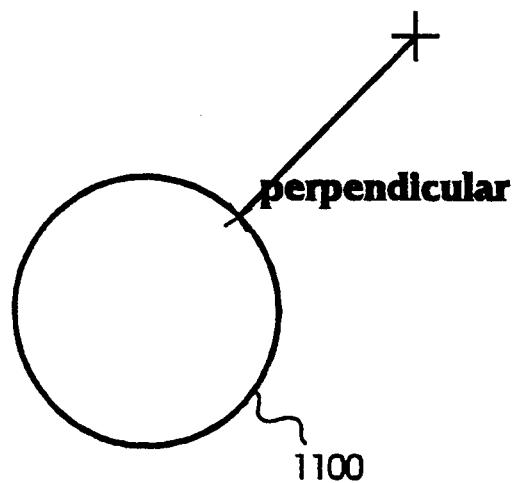
FIGS. 11A-B illustrate the method of automatic pull-off creation for perpendiculars.
Figure 11B:
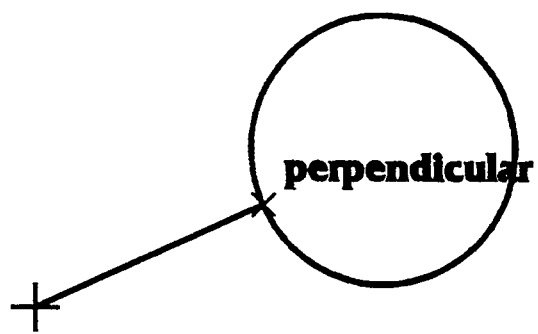
Figure 11C:
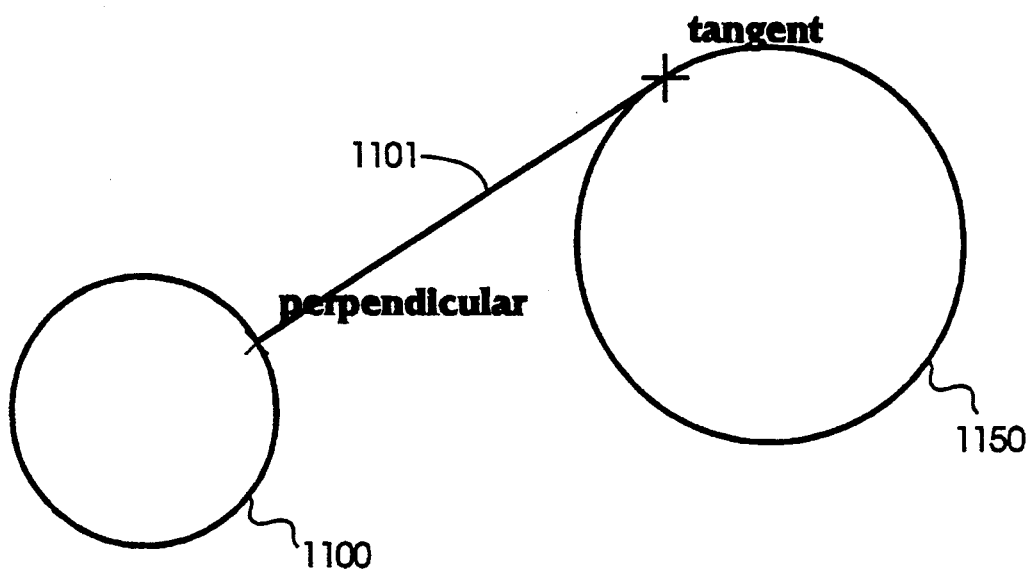
FIGS. 11C-E illustrate additional examples of mutual tangents/perpendiculars.
Figure 11D:
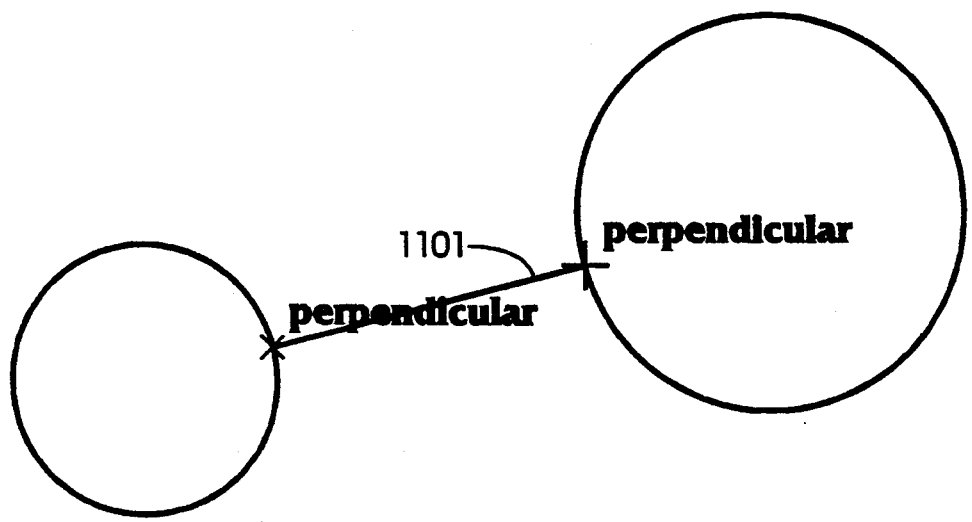
Figure 11E:
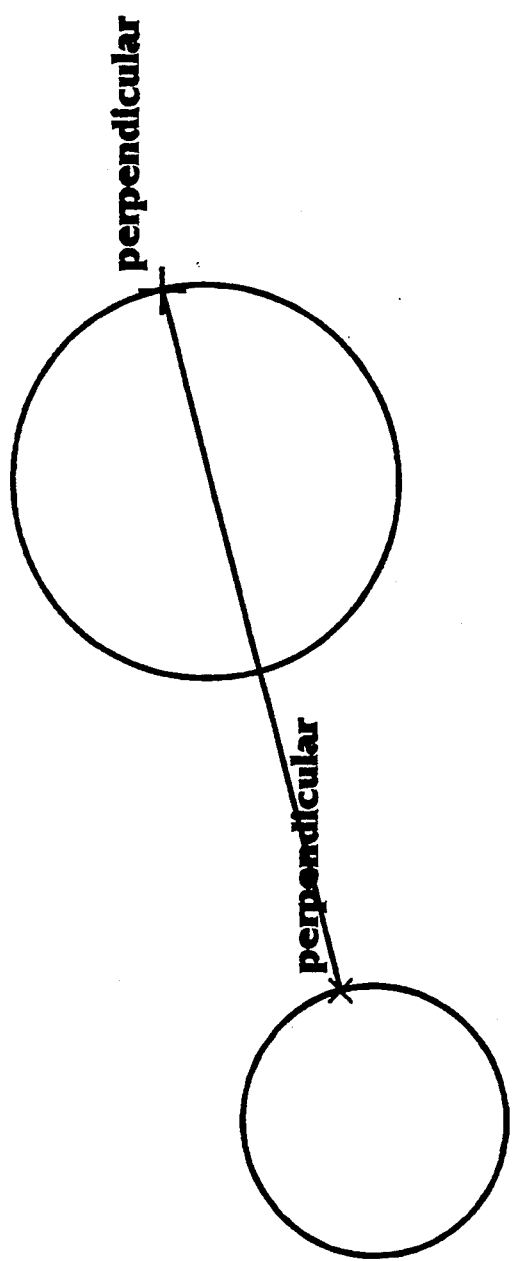

Referring now to FIGS. 11A–D, additional examples are presented and described. In FIGS. 11A–B, automatic pull-off creation of perpendiculars is illustrated for a circle 1100. This technique is the same as the one presented for tangents except that the cursor pulls off in a perpendicular, as opposed to a tangential, direction. In FIGS. 11C–E, mutual tangents/perpendiculars are illustrated where the geometry being created maintains a perpendicular state at its start point. In FIG. 11C, for example, a line 1101 is perpendicularly constrained relative to circle 1100 and tangentially constrained relative to circle 1150. FIG. 11D illustrates the case where line 1101 is perpendicularly constrained with reference to circle 1100 and also perpendicularly constrained with reference to circle 1150. As FIG. 11E illustrates, the perpendicular may be on an opposing side of an object.

Visual Intersections: Behind and Front

Another feature of the geometric inference engine is the locating of "visual intersections," i.e., the intersection of an object with another that is visually in front or behind. This concept is best described with an example.

Figure 12A:
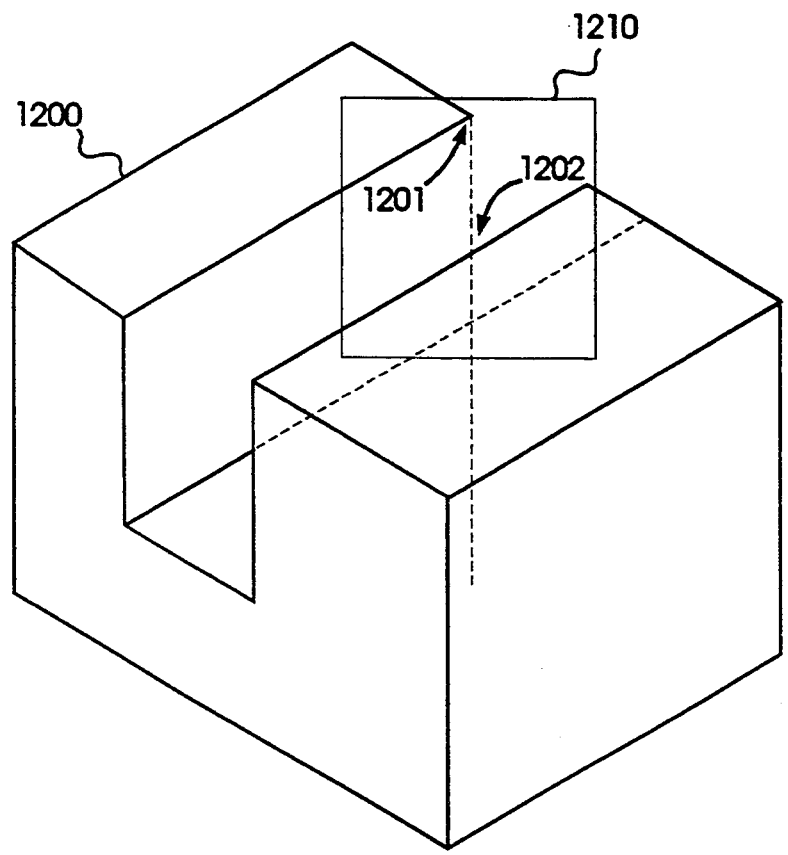
FIGS. 12A-B illustrate the identification and processing of visual intersections for a 3-dimensional figure.
Figure 12B:
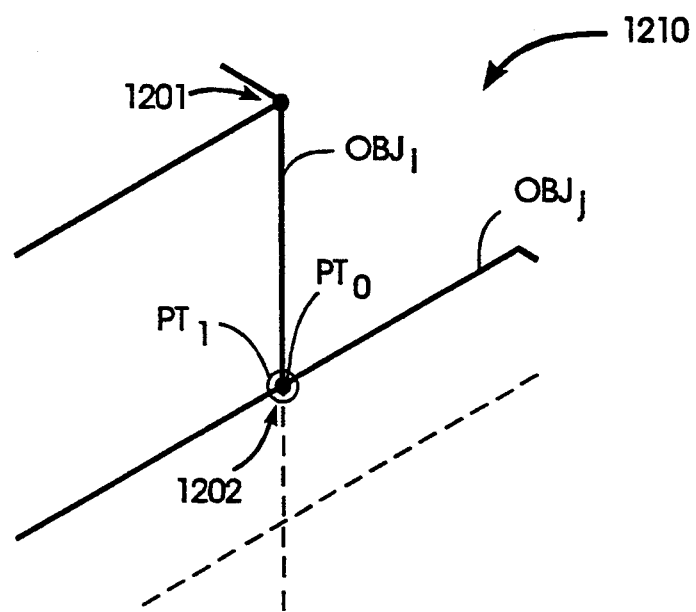

Referring to FIGS. 12A–B, a three-dimensional object 1200 is shown drawn in paraline projection. The mapping of a three-dimensional figure to a two-dimensional display can create new "intersections," for example, at point 1202. While these are not true intersections in 3D space, these visual intersections are nonetheless interesting points which the user may interact with. In FIG. 12B, an enlarged section 1210 of object 1200 is shown to illustrate the concept. On a two-dimensional display (e.g. display 104), $obj_i$ and $obj_j$ appear to intersect at point 1202, and in fact the user may want to access this apparent intersection as an interesting point.

In a true three-dimensional representation, however, $obj_i$ and $obj_j$ do not intersect, that is, both objects never share an identical point in 3D space. Thus, to give the user access to point 1202, actually two points must be provided. A first point ($pt_0$) lies on $obj_i$ at point 1202. This point is "behind" $obj_j$. A second point ($pt_1$) lies on $obj_j$ at point 1202. $Pt_1$ is located in "front" of $obj_i$. If the user draws a line from point 1201 to point 1202, a visual intersection is recognized. Thus, the user is provided with a means to access apparent interesting points which would not exist in a strictly two-dimensional system.

Figure 13A:
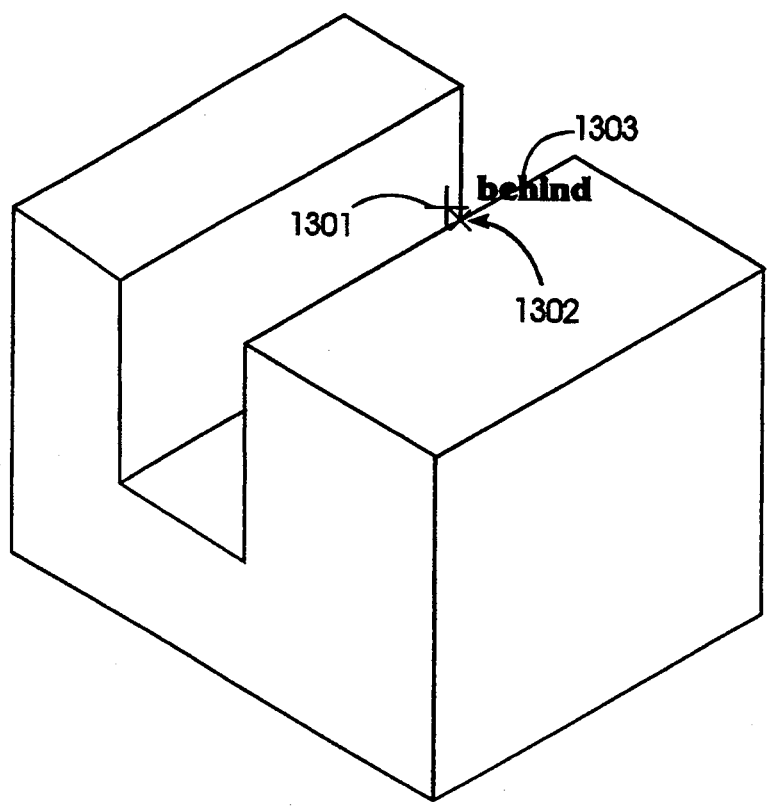
FIGS. 13A-B illustrate "behind" and "front" visual intersections.
Figure 13B:
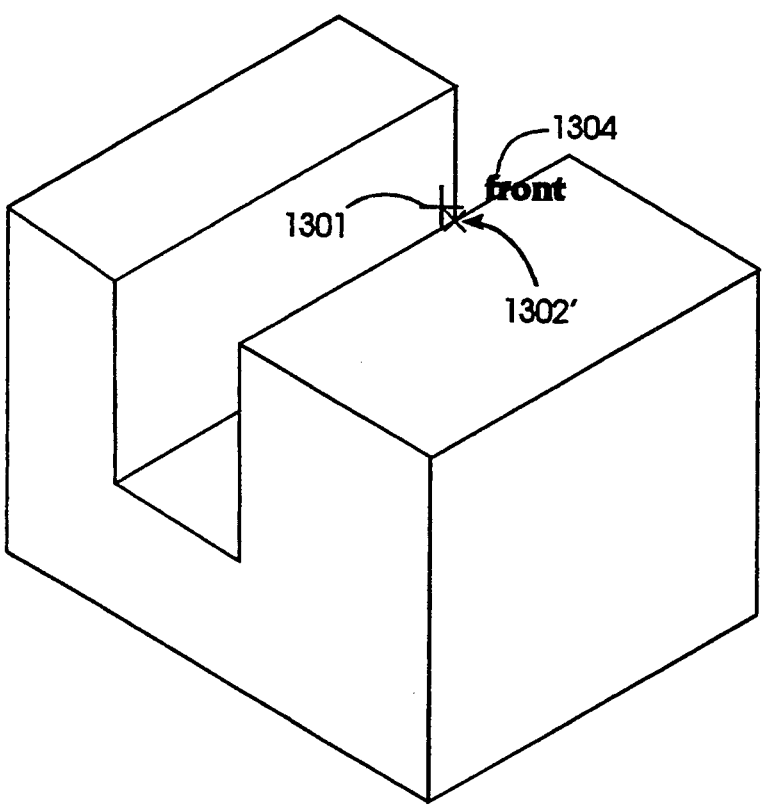

In FIGS. 13A–B, user feedback for visual intersections is illustrated. In FIG. 13A, the user has moved cursor 1301 to point 1302 (indicated by a secondary cursor), thus locating a visual intersection which is behind. In response, the screen message "behind" 1303 is displayed proximally. In FIG. 13B, the user has accessed a visual intersection in front. In this case, cursor 1301 is located at point 1302' which is in front of point 1302; the screen message "front" 1304 is displayed.

Figure 13C:
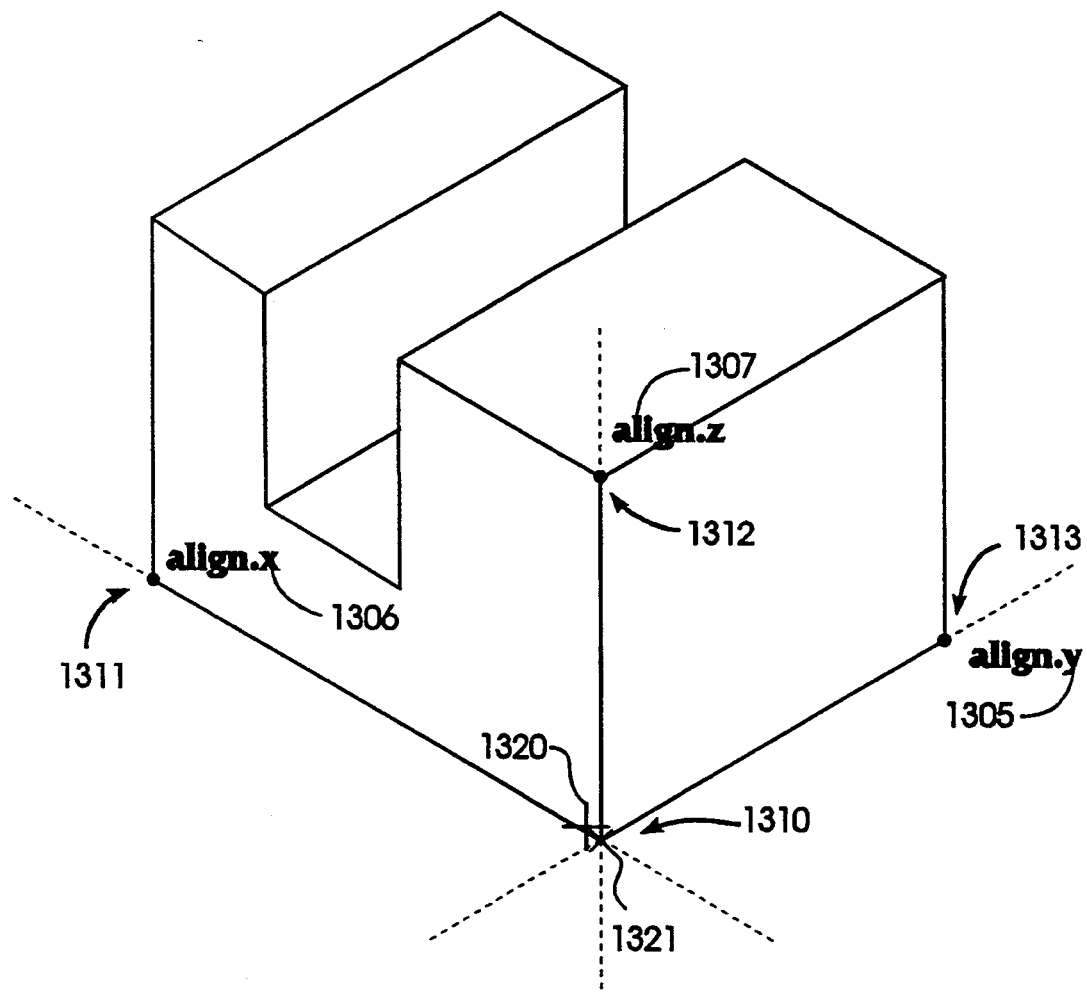
FIG. 13C illustrates cursor alignment to interesting points in 3D space.

Referring now to FIG. 13C, alignment techniques in 3D space are illustrated. As cursor 1320 approaches point 1310, an interesting point is identified. Specifically, point 1310 is aligned in 3D space with points 1311, 1312, 1313. In response, the secondary cursor 1321 snaps onto the interesting point of 1310, align.x 1306 is displayed proximate the x-aligned point (1311), align.z 1307 is displayed proximate the y-aligned point (1312), and align.y 1305 is displayed proximate the y-aligned point (1313). Alignment to one direction (e.g., X) or two directions (e.g., X and Y, Y and Z, or X and Z) are also recognized as interesting points. Thus, alignment in 3D space is identified for use by the user.

Geometric Inference Engine

The internal processes of the geometric inference engine will now be described in detail. The general operation of the geometric inference engine is set forth in detail in copending application Ser. No. 516,004. The present description will set forth in detail the operation of automatic pull-off and mutual tangents/perpendiculars, which is performed by an enterPt function, and the operation of visual intersections, which is processed as an additional case arm of a ptSnap function. Each of these is described in turn.

1. enterPt

Figure 14A:
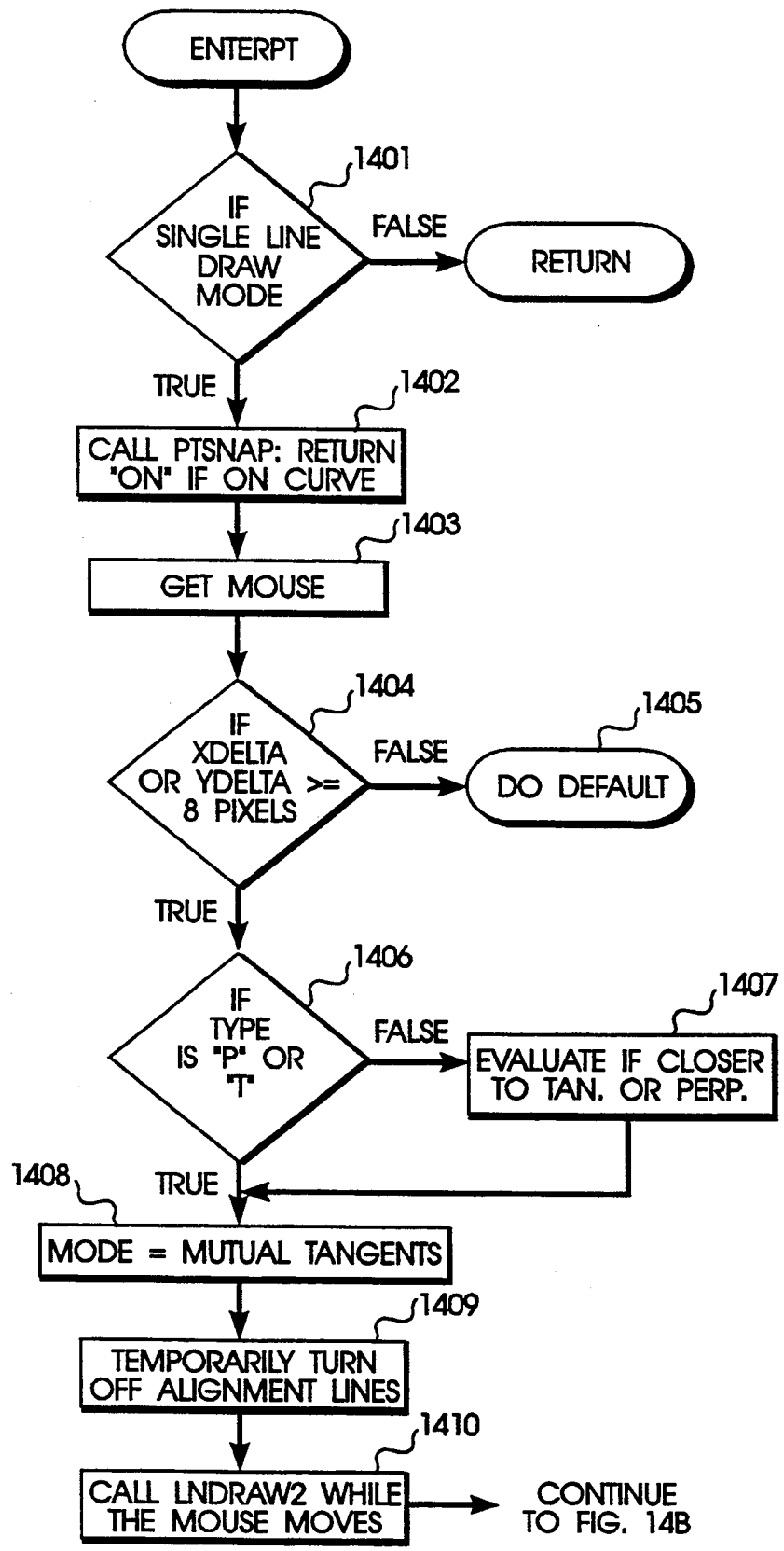
FIGS. 14A-B are a flow diagram for the enterPt function.
Figure 14B:
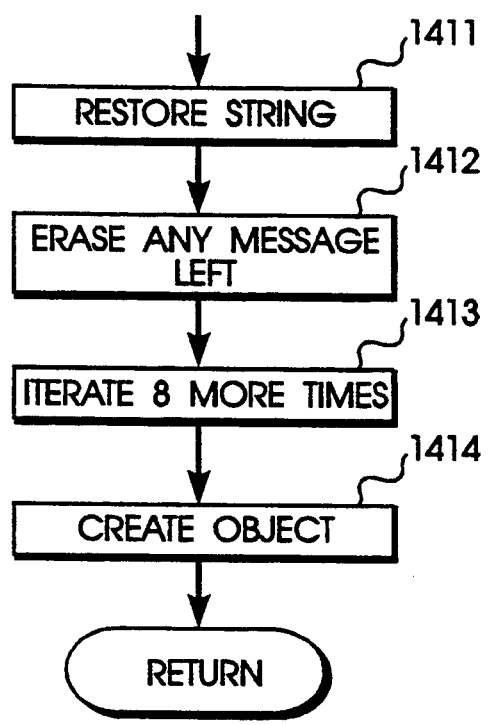

Referring to FIGS. 14A–B, the steps of enterPt are described. At step 1401 the routine checks if the system is in line draw mode, and, if not, it returns. In a preferred embodiment, the mode may be further restricted to a single line drawing mode. At step 1402, ptSnap (described hereinbelow) is called to return the current point. If the current point is on a curve, ptSnap returns the condition "on." At step 1403, while the mouse button is down the function GetMouse is called to return the cursor or mouse location.

At step 1404, the current cursor or mouse location returned by GetMouse is compared to the previous mouse location to see if the mouse has moved. Step 1404 returns "true" if the mouse has moved, e.g., a plurality of pixels, and in a preferred embodiment 8 or more pixels. The individual horizontal (xdelta) and vertical (ydelta) components are analyzed. If xdelta or ydelta is 8 or more pixels, then the routine continues to step 1405 to do the default case (standard line drawing).

If step 1404 is true, then the routine continues to step 1406 to see if the user has typed the letter "p" or "t", indicating that the user wants perpendicular or tangent, respectively. If neither letter has been typed (step 1406 is false), then at step 1407 the pull-off direction of the mouse is evaluated to see if it is closer to the tangent or perpendicular of the curve. This will determine the starting condition for the line to be drawn.

Step 1407 is performed as follows. The tangent to the circle where the user has snapped onto is obtained. The direction in which the user has moved the mouse (at least 8 pixels) defines a vector (mouse vector). This vector is crossed with the tangent just obtained. If the product obtained is less than 0.5, then the vector is closer to perpendicular; and if it is greater than 0.5, then the vector is closer to tangent.

At step 1408, the mode set to mutual tangents. In step 1409, the temporary alignment lines which may be generated by the inference engine are temporarily turned off as they are not desired at this point. This is accomplished by temporarily masking out the alignment option in the method string.

At step 1410, while the mouse moves, the function LnDraw2 is called. LnDraw2 tracks both end points of the line to be drawn (the steps of LnDraw2 are set forth hereinafter). At step 1411, the method string is restored, thus restoring any alignment lines. At step 1412, any message left ("tangent" or "perpendicular) by LnDraw2 is erased. Since LnDraw2 performs only a rough approximation, at step 1413 a plurality of iterations are performed. In a preferred embodiment, 8 iterations are used. This yields between 12 and 16 digits of precision. Each iteration consists of repeating LnDraw2 with a higher degree of tolerance. At step 1414, the actual object (line) is created. The procedure concludes by returning.

Figure 15A:
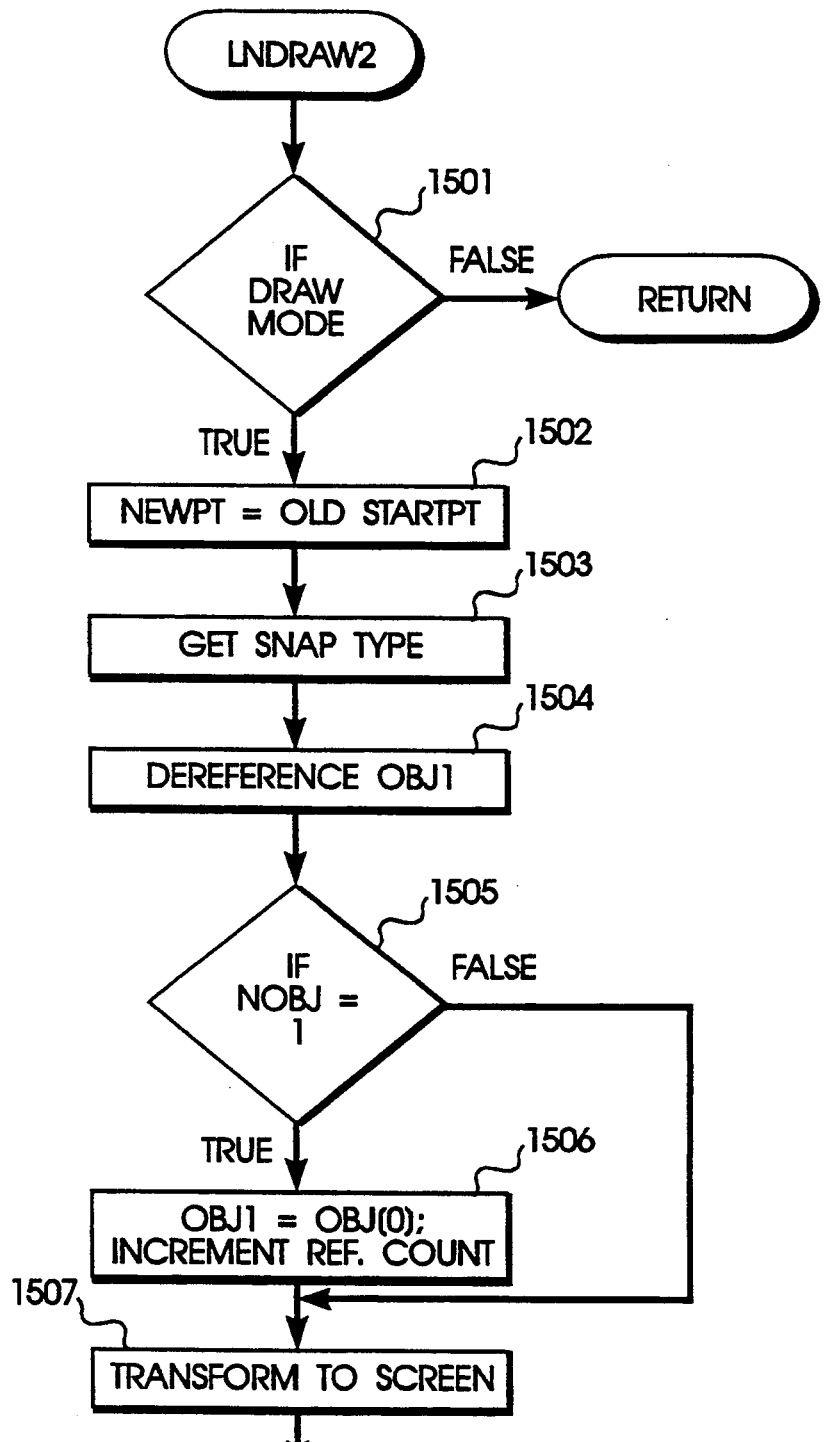
FIGS. 15A-B are a flow diagram for the LnDraw2 function.
Figure 15B:
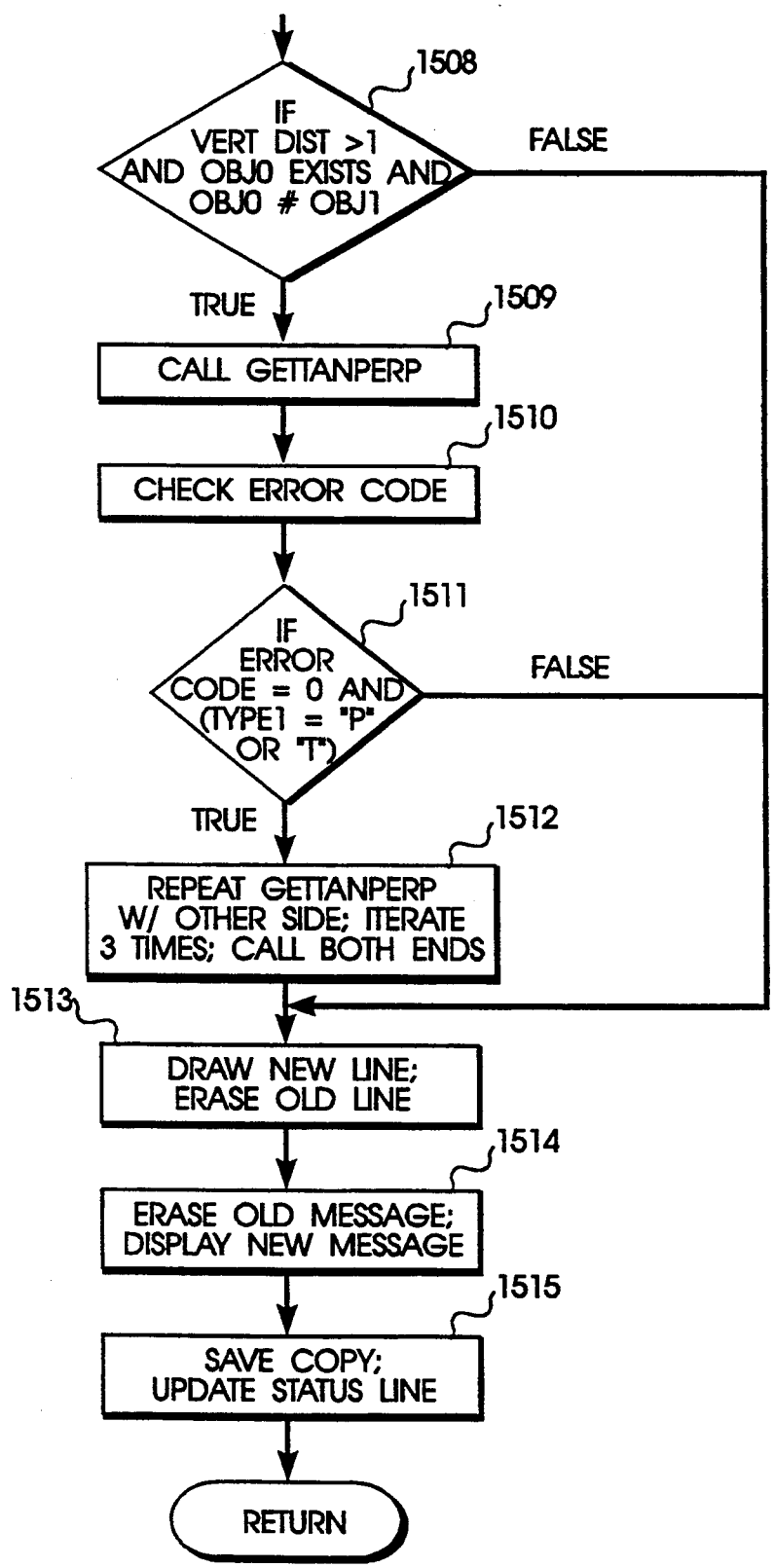

Referring to FIGS. 15A–B, the steps of LnDraw2 are described. This routine returns a new endpoint, a "draw" variable indicating whether this routine was called for the purpose of drawing or erasing a line, a flag indicating whether the mouse has moved, a data record ("p") indicating the value of the start point, and a copy of the snap record.

The "p" data record comprises the following data types:
1. $Type_0$: this is the condition of the start point.
2. $Type_1$: this is the condition of the end point.
3. $pt_0$: this is the actual point of the start point.
4. $pt_1$: this is the actual point of the end point.
5. $obj_0$: is the object located at $pt_0$.
6. $obj_1$: this is the object located at $pt_1$.

The steps of LnDraw2 are as follows. At step 1501, the routine checks whether the system is in draw mode. If not (step 1501 is false), then the routine returns; otherwise, the routine continues to the next step. At step 1502, the old start point is moved into the new point (newpt). At step 1503, the routine gets the snap type from the snap record (set forth hereinbelow and described in copending application Ser. No. 516,004); in particular, the routine is interested in whether the snap type is equal to "p" or "t". At step 1504, the old $obj_1$ is dereferenced.

At step 1505, the routine checks the number of objects referenced by snap. If one object is referenced, then in step 1506 $obj_1$ is set equal to that referenced object, and its reference count is incremented. However, if the number of objects is not equal to 1 (step 1505 is false), then step 1506 is skipped. At step 1507, the points are converted from world coordinates to screen coordinates, thereby facilitating the presentation on display 104.

At step 1508, several conditions are tested before the routine continues any further. In particular, the start point and the end point tested cannot be the same point; this is confirmed by testing whether the vertical distance between the two is greater than at least 1 pixel. In addition, $obj_0$ must exist and $obj_0$ cannot equal $obj_1$. If any of these conditions fail (step 1508 is false), then the routine skips down to step 1513. Otherwise, if these conditions are satisfied (step 1508 is true), then the routine continues to the next step.

At step 1509, the function getTanPerp is called. getTanPerp is passed a type ("p" or "t"), an object (curve), a point on that object, an endpoint, and a tolerance. It returns a point on the curve which would create a line to that curve which would satisfy the type passed (tangent or perpendicular).

Figure 16A:
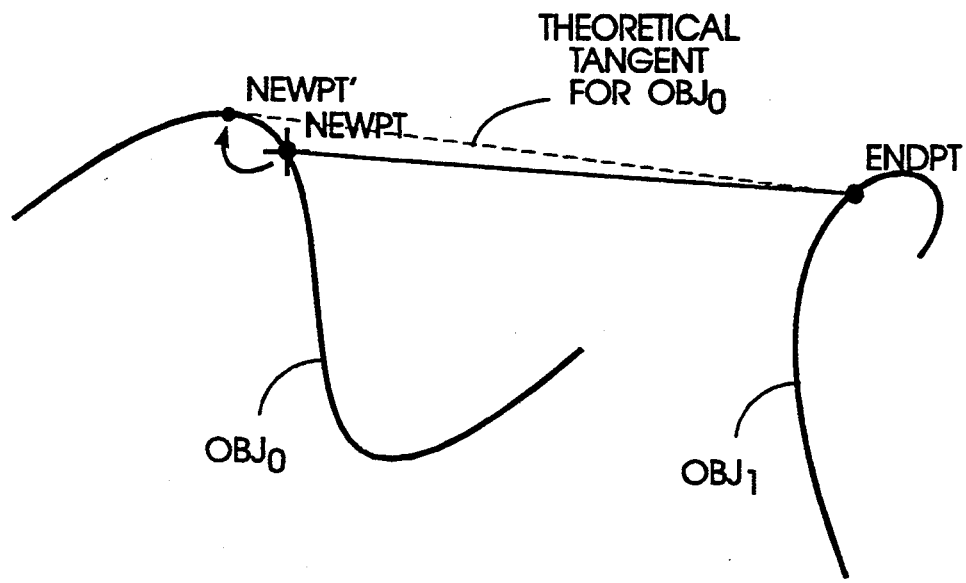
FIGS. 16A-B illustrate the operation of getTanPerp.
Figure 16B:
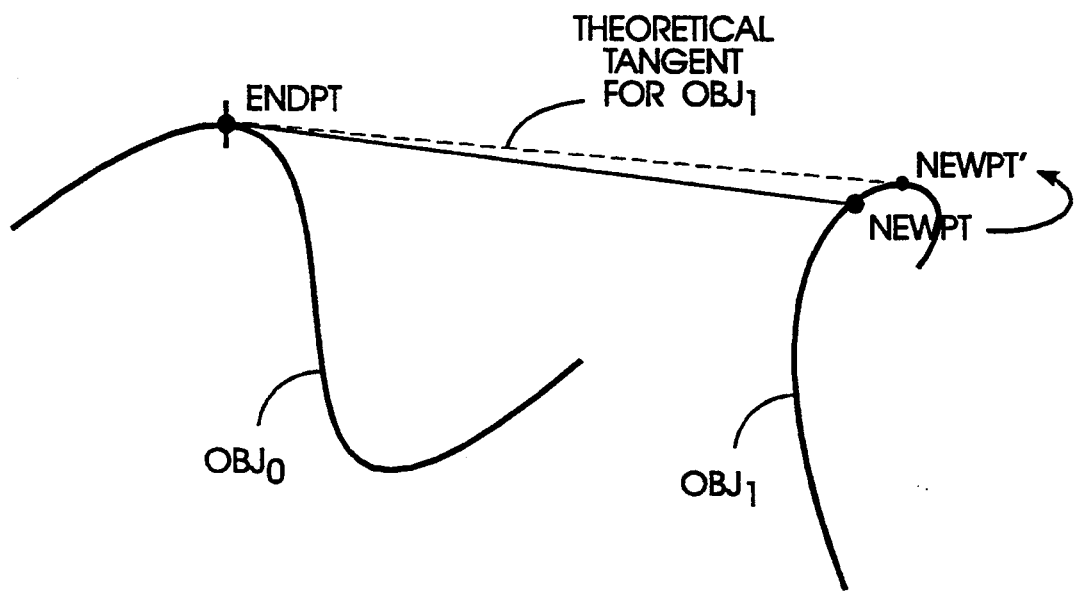

Referring to FIGS. 16A–B, the operation of getTanPerp is illustrated. getTanPerp is passed type="t", an object ($obj_0$), a point on that object (newpt), an endpoint (endpt), and a certain tolerance. It returns a point (newpt') on the curve ($obj_0$) which would create a line (theoretical tangent) on the curve which satisfies the type passed (tangent). In response, newpt is moved to this new location (newpt'). As seen in FIG. 16B, the process is repeated for the opposing end (described in step 1512 below).

Referring back to FIG. 15B, in step 1510, the routine checks the error code of getTanPerp. In step 1511, if there is no error (error code=0) and the type for the other object is either perpendicular or tangent ($type_1$ ="p" or "t"), then the procedure continues to step 1512, otherwise this step is skipped. At step 1512, getTanPerp is repeated for the other side, i.e., with the end point as a new point (newpt) and the former new point as the end point.

Step 1512 is illustrated in step 16B. getTanPerp is passed type="t", an object ($obj_1$), a point on that object (newpt), an endpoint (endpt), and a certain tolerance. It returns a point (newpt') on the curve ($obj_1$) which would create a line (theoretical tangent) on the curve which satisfies the type passed (tangent). Then, newpt is moved to this new location (newpt'). A plurality of iterations are performed on both ends. In a preferred embodiment, three iterations are performed. These iterations are required since when one point moves the corresponding opposite point moves. Thus, the line to be drawn may no longer be tangent or perpendicular as required.

At step 1513, the new line is drawn and the old line is erased. At step 1514, the old message (either "perpendicular" or "tangent"), which was located at the old start point of the line, is erased, and the new message is displayed. In step 1515, the data structures employed are saved for future reference and the screen status line is updated.

2. ptSnap

The ptSnap function, which is called whenever the mouse moves, is central to the operation of the geometric inference engine. For a given location on the screen, ptSnap locates the nearest geometry.

It is helpful at the outset to study the data structure which ptSnap uses. ptSnap is passed p, a pointer structure variable of type snap_record. The input values in p comprise the following:
a) probe: a variable of type Point which specifies the current screen location of the cursor.
b) hitrad: an integer variable which specifies the hit radius in pixels.
c) method: a character string which specifies the order in which different interesting points are tested by ptSnap; the string is initially defined globally but is changed locally within each individual function.

d) nprev: an integer variable which counts the number of points which are considered special.

e) prevPt: an array of points that the user wants alignment to, the last point (array member) being the location from where the alignment line is drawn.

f) tangentV is an array of real numbers which is used to constrain operations, such as drawing or transformations, to lie within a particular tangent.

The values ptSnap calculates and stores, i.e., the output variables, comprise the following:

a) pt: an array of three reals which specifies the actual point found.

b) type: an integer variable used to specify the ASCII value of the method used to find pt, for example, "i" (ASCII 105) for intersection or "t" (ASCII 116) for tangent.

c) userch: a character variable which allows the user to modify the method string.

d) nobj: an integer variable which specifies the number of objects used in a method. In freepoint, for example, nobj is equal to 0 since it is not related to any geometry. nobj is equal to 1 for endpoints and equal to 2 for intersections.

e) obj: an array of pointers to records of type gobject which specifies the objects used.

f) objFlag: an integer array used to specify whether an object ms permanent or temporary geometry.

g) niter: an integer variable used to count the number of iterations through the loop.

h) objT: an array which stores the t values for objects parametrically defined.

i) tanvect, tanvectsiz, and tanvectcnt: store the tangent and perpendicular information for a given point. tanvect is a pointer variable to an array of reals where the tangent and perpendicular vectors are stored. tanvectsiz stores the size of the array, while tanvectcnt stores the number of such vectors.

In the C language (Kernighan, B. and Ritchie, D., *The C Programming Language*, Second Edition, Prentice Hall, 1988), the snap_record may be defined, for example, by the following statements:

```
struct snap_record {
  /* input values */
  Point probe;          /* cursor point */
  int hitrad;           /* hit radius in pixels */
  char *method;         /* string describing auto method */
  int nprev;            /* number of previous points */
  POINT3D *prevPt;      /* array of prev points */
  REAL tangentV[3];     /* tangent vector */
  /* output values */
  REAL pt[3];           /* result point */
  int type;             /* method used to find pt */
  char userch;          /* user char, overrides method string */
  int nobj;             /* # of objects used in method */
  struct gobject *obj[2]; /* the objects used */
  int objFlag[2];       /* object flags */
  int flags;            /* flags */
  int niter;            /* number of iterations */
  EXTENDED objT[2];     /* t values of objects */
  UINT tanvectcnt;      /* number of tangent vectors */
  UINT tanvectsiz;      /* array siz */
  REAL *tanvect;        /* tangent vectors */
};
```

Another data structure useful in the operation of ptSnap is snap_data, a locally defined record. It comprises the following variables:

a) snaprecord: a pointer of type snap_record.

b) bestpt, bestdist, and besttype: store the best point found, its distance from the probe, and its type, respectively. These variables are collectively referred to as the best record.

c) snapobj: a pointer to snapobjs, an array which stores the objects found within the hit radius.

Figure 17A:
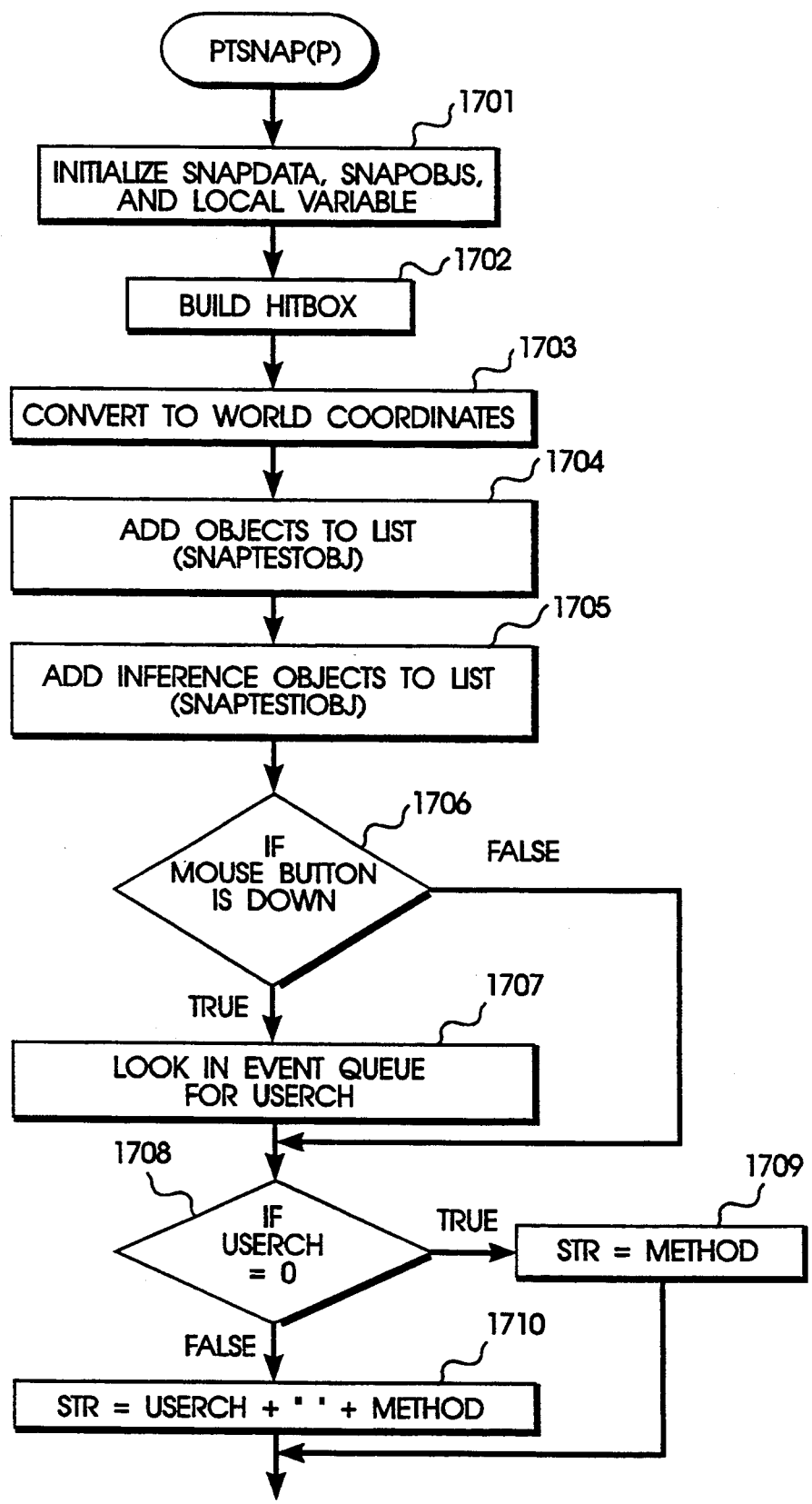
FIGS. 17A-B are a flow diagram for the ptSnap function.
Figure 17B:
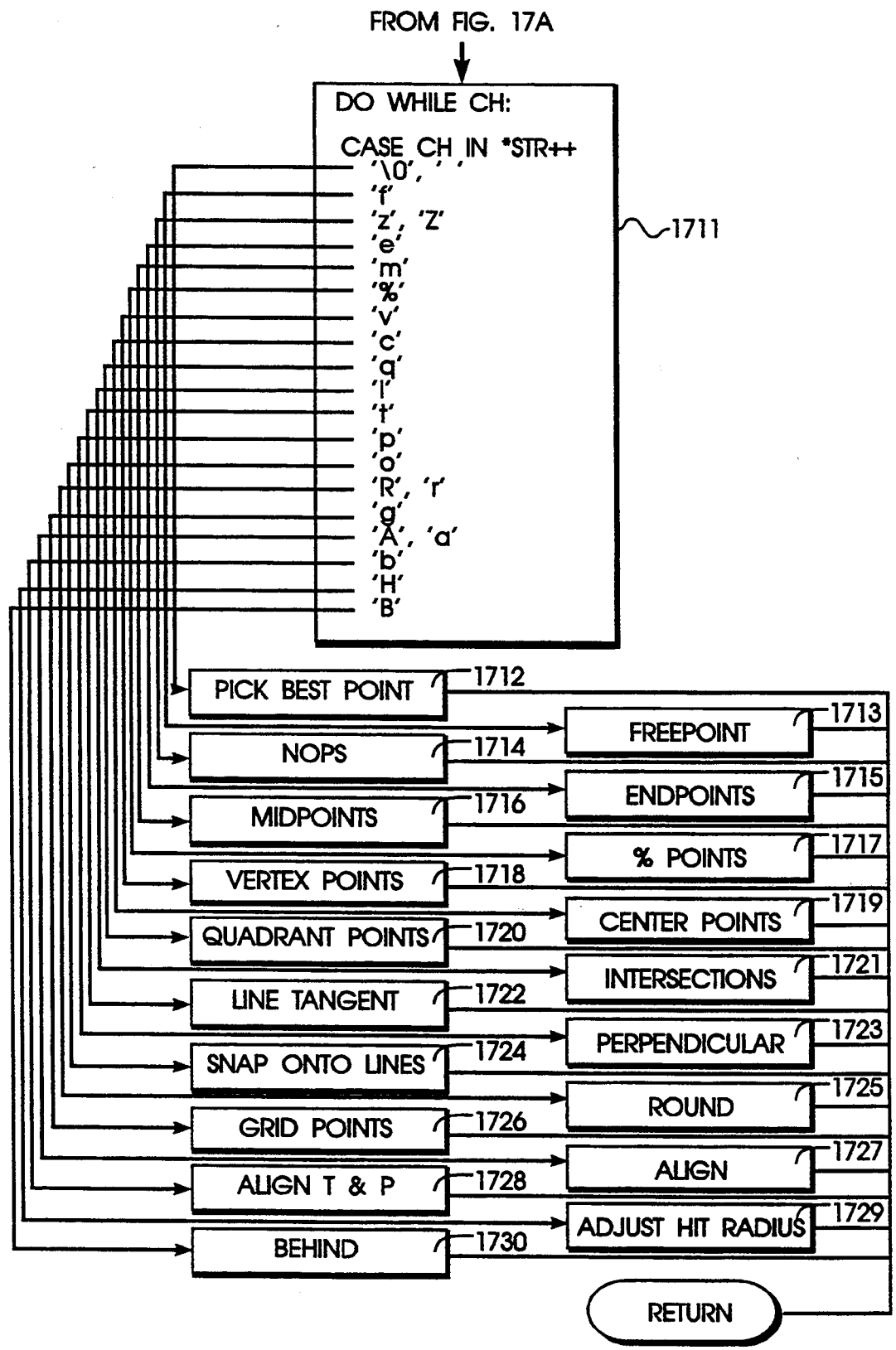

FIGS. 17A-B illustrate the operation of ptSnap. At step 1701 the function sets up local copies of the snapdata and snapobjs records and initializes local variables. At step 1702, a hitbox is constructed by calculating the four corners of a box whose distance from the probe equals hitrad. In step 1703, these points are converted to world coordinates. In step 1704, the function snapTestObj is passed an object and the snap_record pointer p. For each object within the hitbox, snapTestObj tests whether it is close enough to the user probe to be considered part of the active geometry.

Figure 18A:
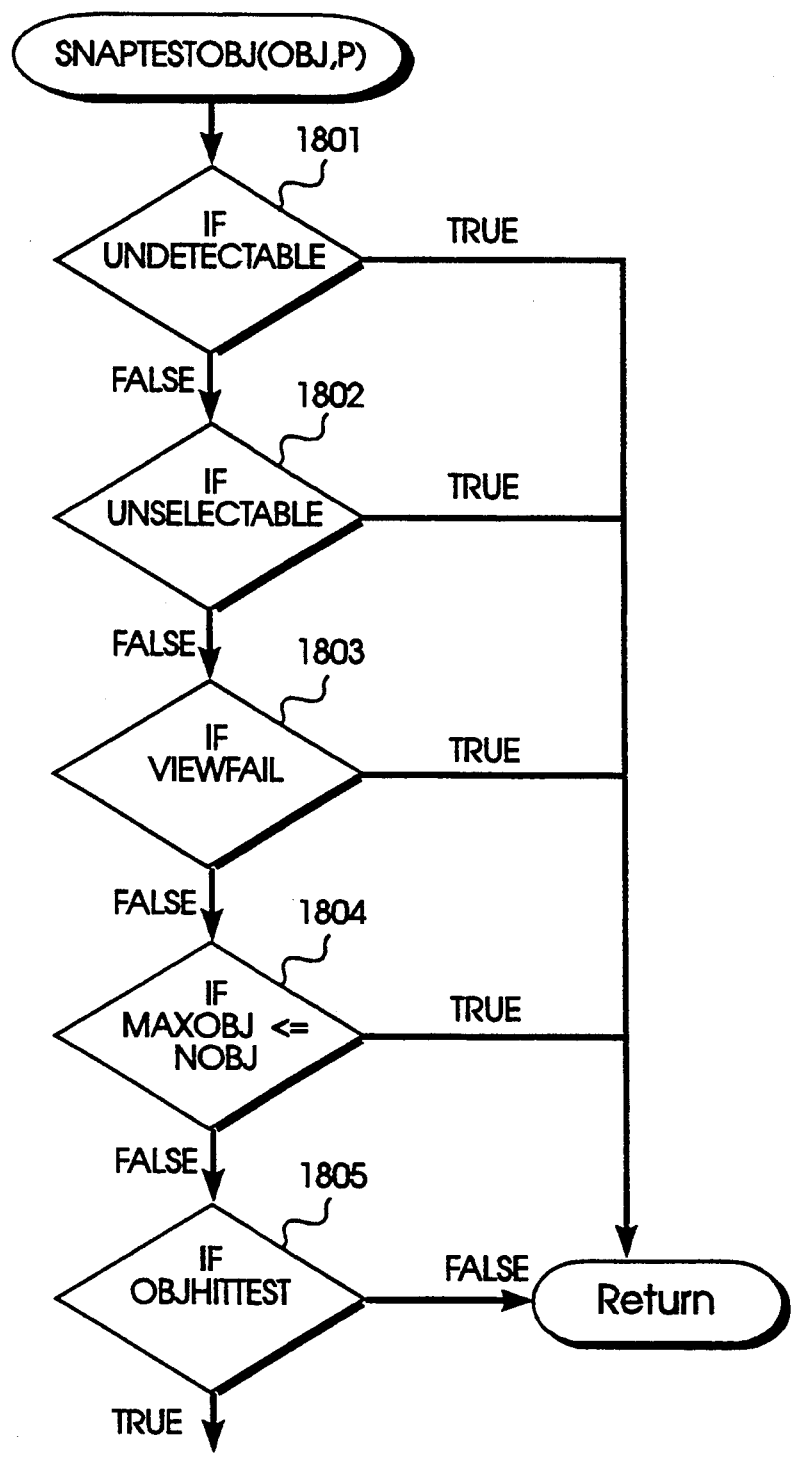
FIGS. 18A-B are a flow diagram for the SnapTestObj function.
Figure 18B:
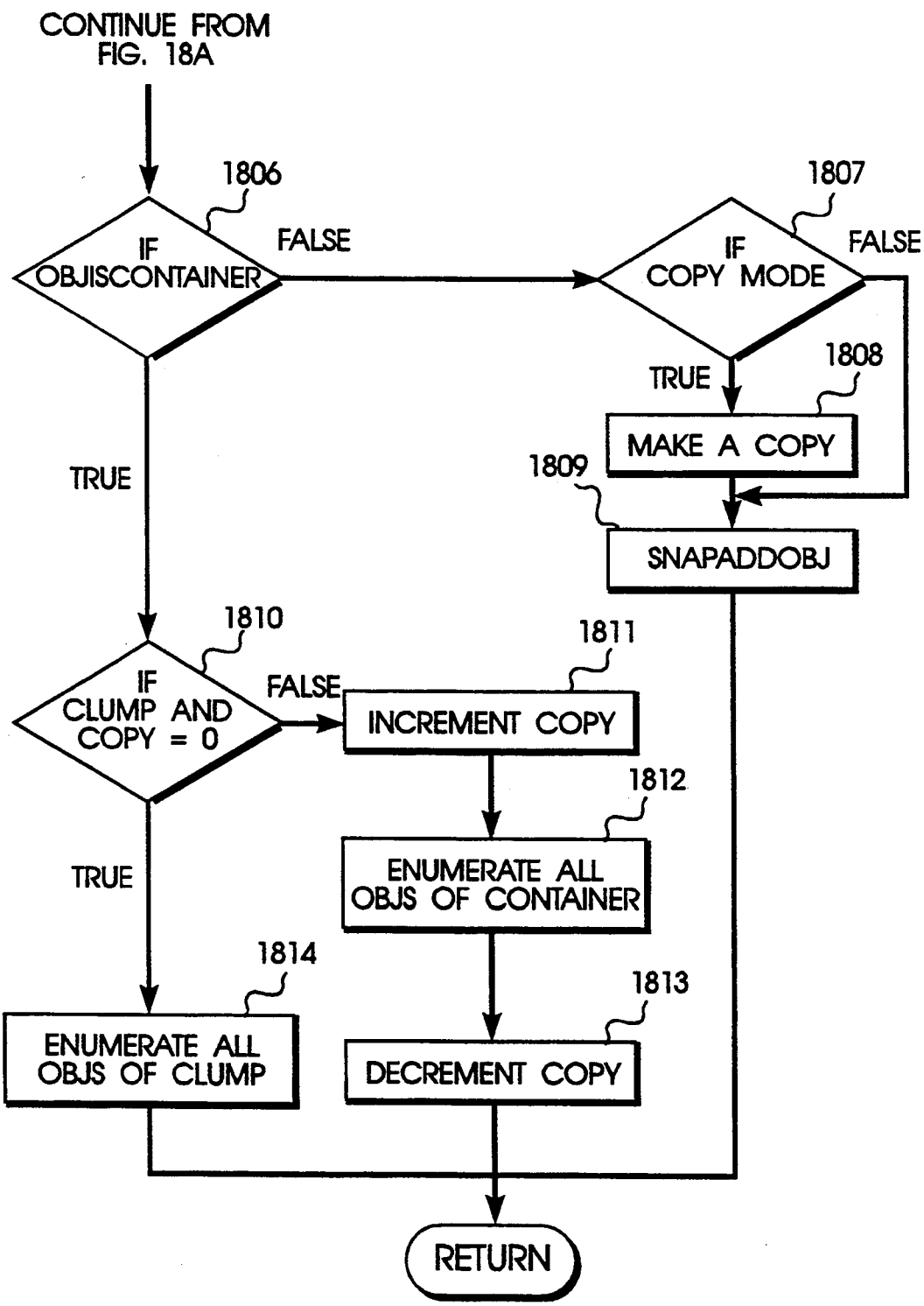

FIGS. 18A-B illustrate the steps of snapTestObj. At step 1801, the function checks whether the object passed is undetectable. For example, an object is undetectable while it is being created. For undetectable objects, the snapTestObj function returns; otherwise, it goes to step 1802 to check whether the object is unselectable. An object is unselectable if it is masked from the system. For example, the user may wish to mask out objects of certain colors, objects located in certain layers, or objects of a particular geometry. For unselectable objects, the function returns. At step 1803, the function tests whether a given object is capable of being displayed at the current view. If viewfail is set to true (non-zero), the function returns. Step 1804 confirms that the number of objects (nobj) does not exceed the object array, i.e., nobj is not equal to or greater than the maximum allowed objects. At step 1805, objHittest is called to make sure that the object passed to snapTestObj is within the hitbox. If it is not, then snapTestObj returns.

As FIG. 18B illustrates, at step 1806, snapTestObj checks whether the object is a container. An object which comprises a group of objects is a container. For example, a box, which comprises a group of lines, is a container. Primitive objects, such as lines or arcs, are not containers. Since the geometric inference engine is only interested in snapping to primitive objects, containers are broken down into their primitive members. If at step 1806, an object is not a container, then at step 1807, snapTestObj checks whether the system is in copy mode. If so, then at step 1808, a copy is made. Otherwise, at step 1809, the function calls snapAddObj which adds the currently passed object to the object list.

However, if the object is a container at step 1806, then at step 1810, the function checks whether the container is a "clump," i.e., a container defined by four lines. If the container is a clump and copy mode is off, then at step 1814 the function enumerates all the objects in the clump by calling snapTestObj recursively.

Container objects which are not clumps at step 1810, e.g., symbols, require additional steps since only one copy exists for each in the system. Thus, at step 1811, the copy flag is incremented before the objects of the container are enumerated at step 1812. This allows for a copy transformation, assuring that each object is properly placed. At step 1813, the copy flag is decremented and snapTestObj returns.

Figure 19:
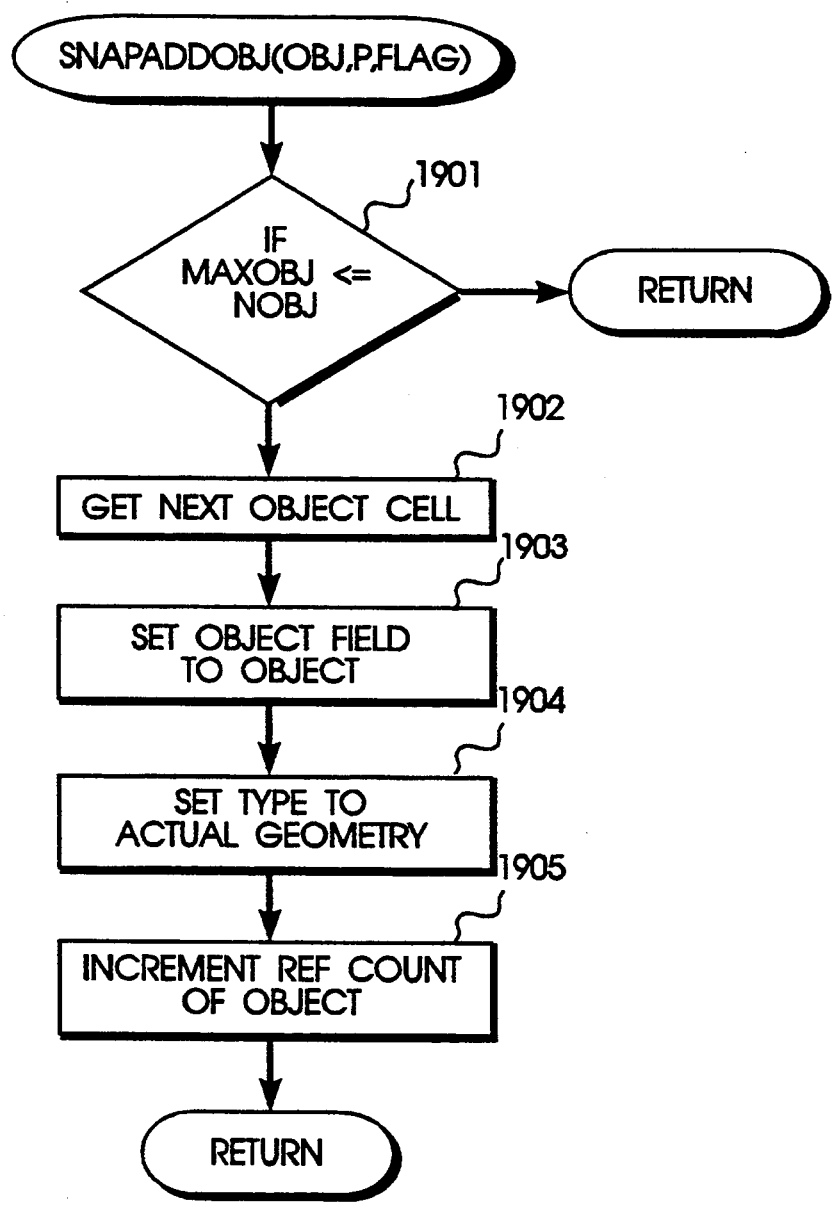
FIG. 19 is a flow diagram for the SnapAddObj function.

FIG. 19 illustrates the snapAddObj function. It is called with an object, snap_record, and a copy flag. At step 1901, the function checks whether the bounds of the object array are exceeded. At step 1902, the function gets the next object cell from p. At step 1903, the object field of the object cell is set equal to the object that is past in. The object type is set equal to actual geometry (type =0) in step 1904. At step 1905, the reference count of the object is incremented to facilitate freeing it later. snapAddObj returns to snapTestObj which returns to ptSnap.

Referring again to FIGS. 17A-B, at the completion of step 1704 in ptSnap, all the actual geometry in the neighborhood of the probe is elucidated. At step 1705, ptSnap repeats this process for inference objects. ptSnap calls snapTestIObj, a function similar to snapTestObj except that the object types are not actual geometry.

The priority in which ptSnap seeks interesting points is determined by the "method" string. A default method is defined globally, but the user may override this by pressing a key on the keyboard 102. Steps 1706–1710 test for this condition. If the mouse button is still down in step 1706, then at step 1707 ptSnap checks the event queue for a user character (userch). If there is no user character in step 1708, then the local method string (str) is set to the global method at step 1709. However, if there is a user character, it is given priority at step 1710 by placing it and a space character (ASCII 20) at the beginning of the method string, i.e., str=userch+"·+method. The space character has special significance: ptSnap checks the condition, defined by userch, first and returns if it exists. For example, if the global method is set to "miqp" (midpoints, intersections, quadrant points, and perpendiculars) and the user presses 't' (tangents), then ptSnap will change the method string to "t miqp." In this case, tangents are sought and returned before all other interesting points.

FIG. 17B illustrates the case statement which directs ptSnap's investigation for interesting points. At step 1711, ptSnap sequentially tests for different interesting point types, the order of search being specified by the character sequence in the method string. For each type of interesting point, the best point (bestpt), if any, is determined and returned to the geometric inference engine. However, for efficiency, ptSnap returns without any point when there is a timeout error, e.g., when the cursor moves to a new screen location before any best point is located. Individual case arms 1712–1729 for step 1711 are described in detail in copending application Ser. No. 516,004.

Figure 20:
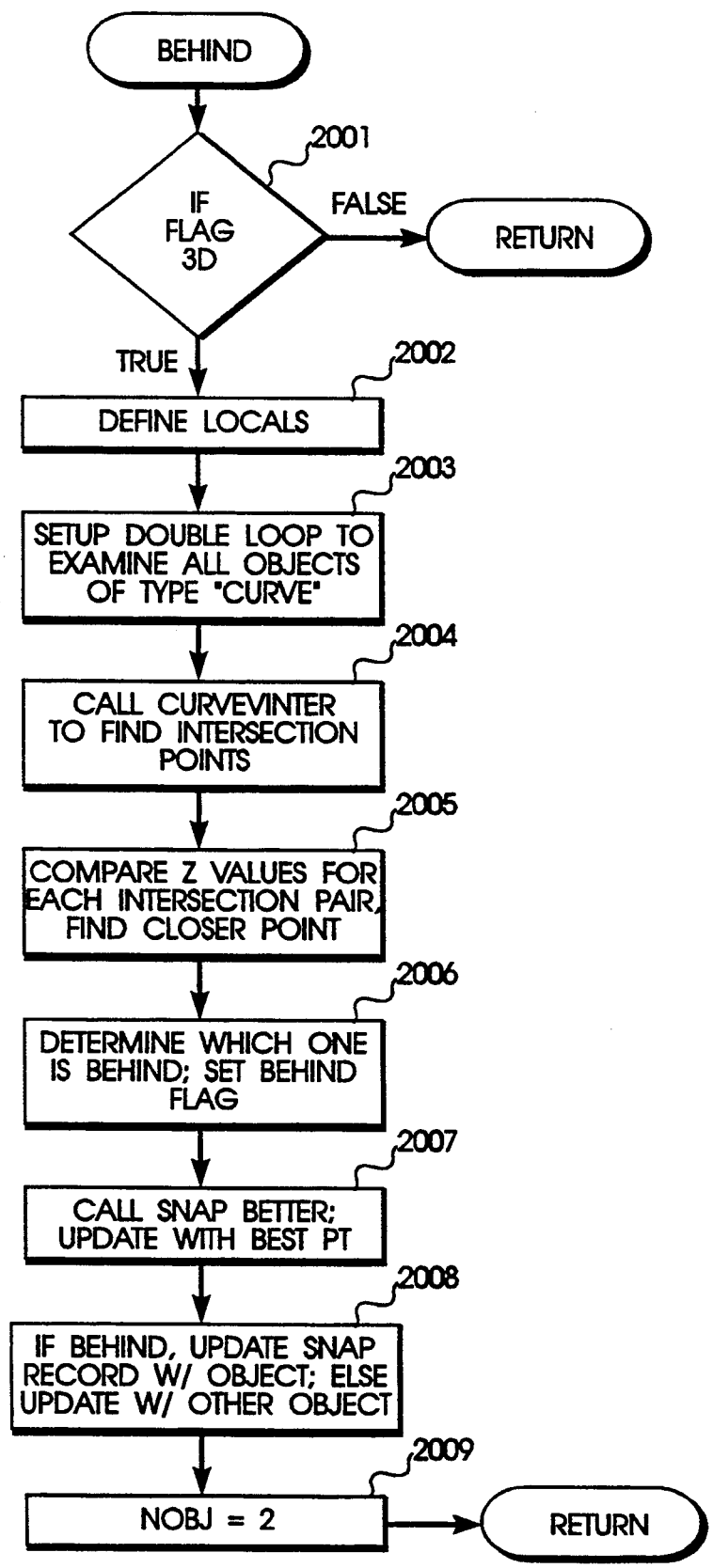
FIG. 20 is a flow diagram for the "behind" case arm in the ptSnap function.

In the present invention, a new case statement is defined for ptSnap: behind ("B") 1730. FIG. 20 illustrates the steps for the behind case. In step 2001, the routine checks whether the system is operating in 3D mode (flag 3D=true), and if not the procedure returns. Otherwise, the procedure continues to step 2002 to set up local variables. At step 2003, a double loop is set up so that each curve (object of type curve) may be examined against each other curve for the presence of any intersections. In a preferred embodiment lines, arcs, splines, circles, and ellipses are defined to be curves. At step 2004, curveVIntr is called to return an array of intersection points between curves and a count of the number of intersections (vinterCnt).

Before finding intersections, it is necessary for curveVIntr to map each curve into 2D space, but the z component for each point is stored. In step 2005, the routine compares the z value or depth for each intersection pair and finds the one closest (to the user). At step 2006, the routine determines which of the two points is "behind" and, accordingly, sets a behind flag. In other words, the point with the higher z value is the point which is behind. At step 2007, a routine, snapBetter, is called to compare the current interesting point found with the previous best point found. Whichever one is closer to the user probe (mouse location) is saved as the best point (i.e., best record is updated).

In step 2008, if the behind flag is true, the snap record is updated with the current object (the behind object); otherwise the snap record is updated with the other object (the front object). In step 2009, the number of objects is set equal to 2 and the case arm concludes.

Figure 21A:
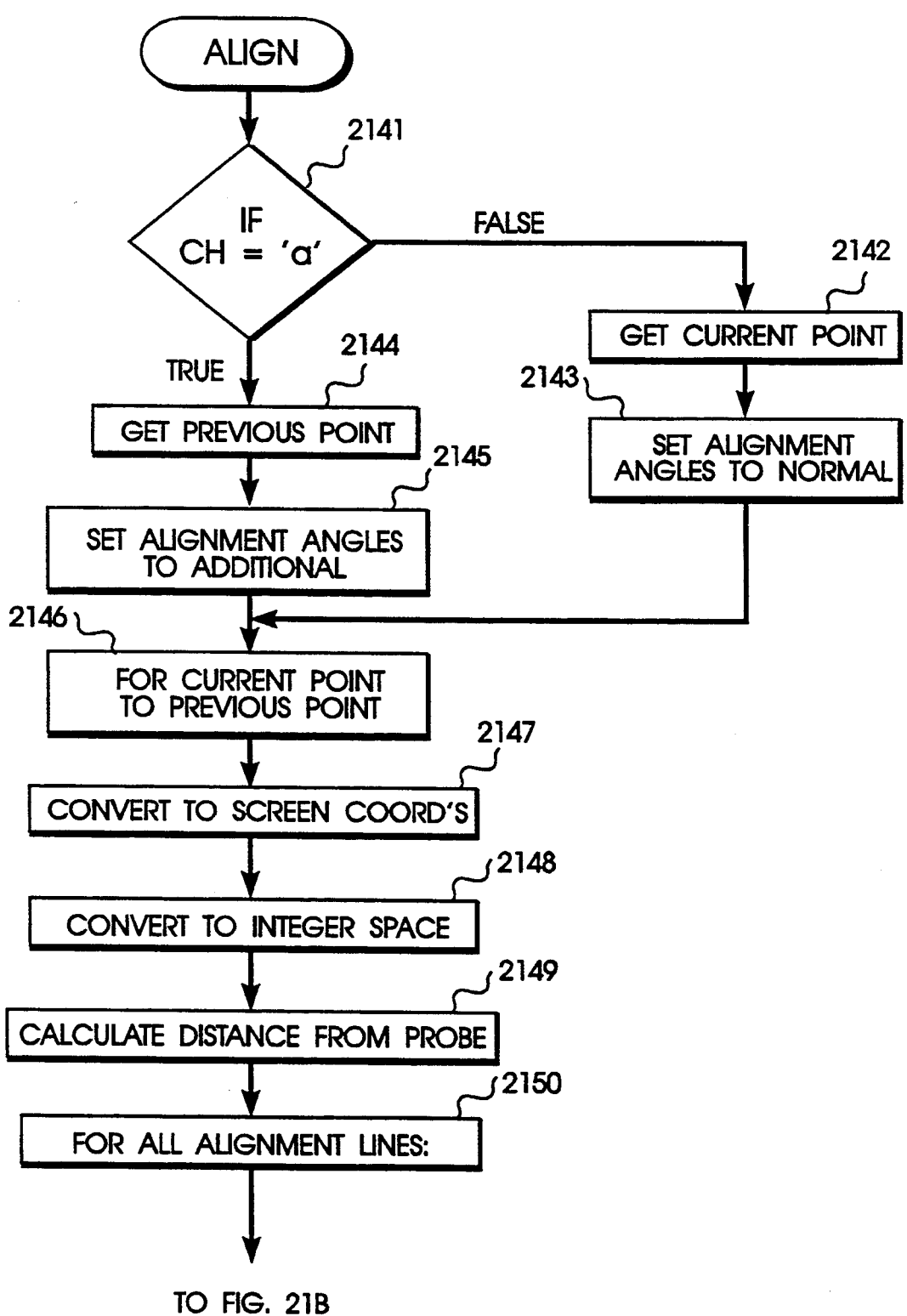
FIGS. 21A-C are flow diagrams illustrating the "align" case arm in the ptSnap function.
Figure 21B:
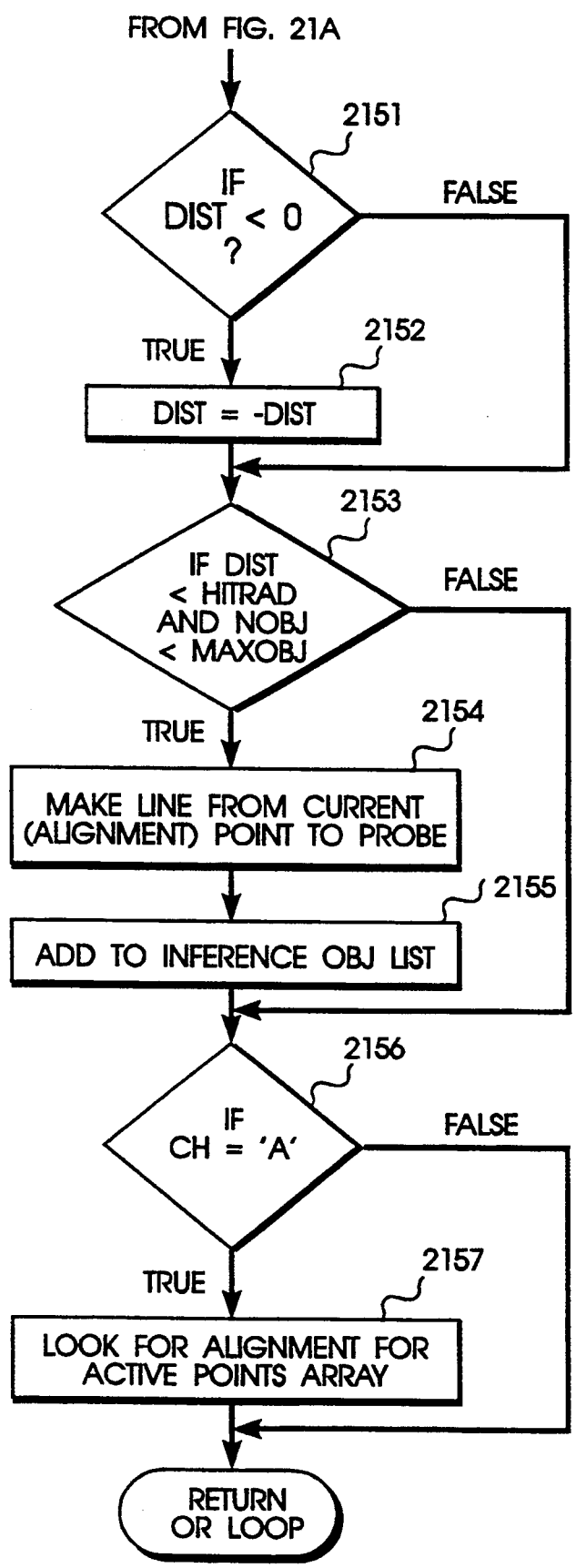
Figure 21C:
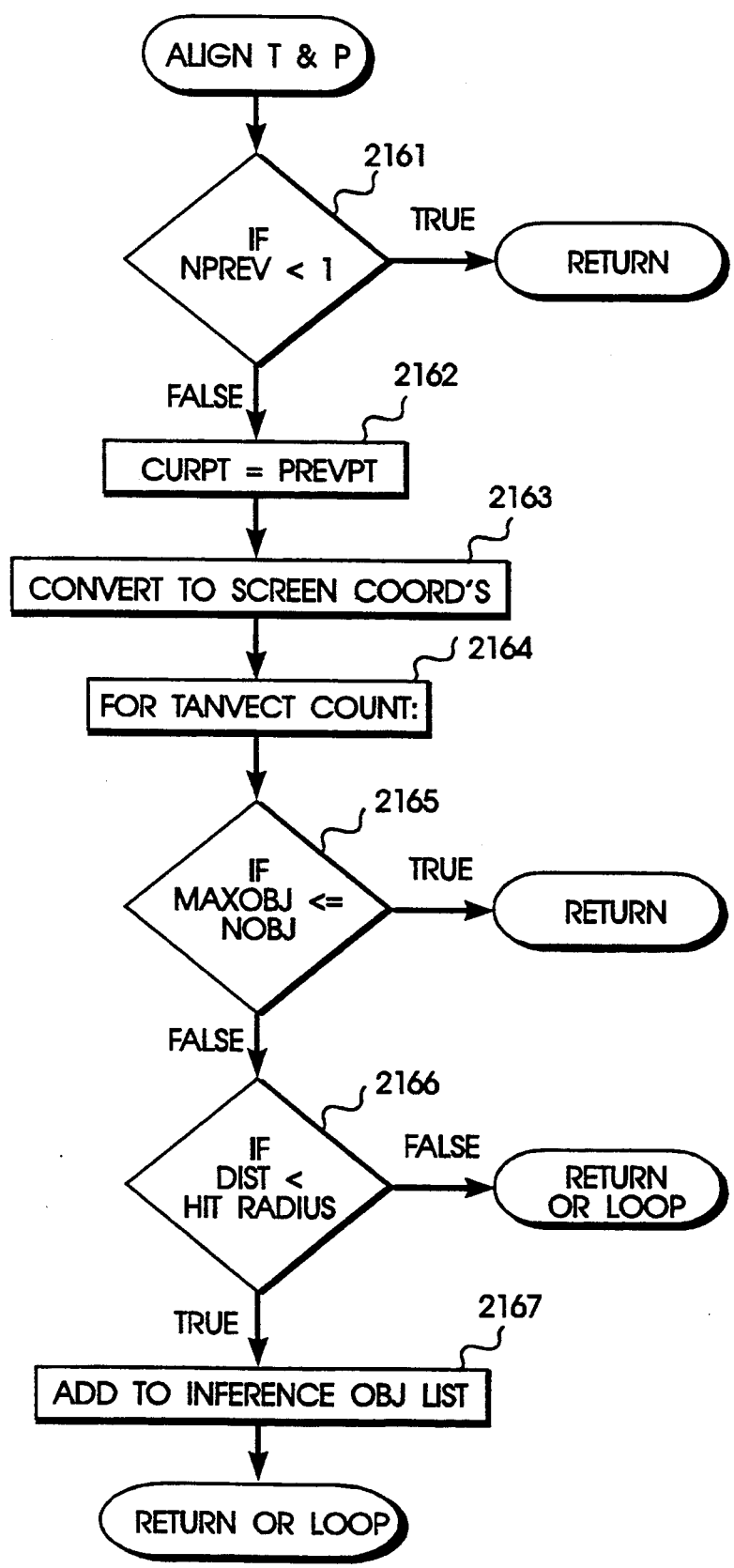

Referring again to FIG. 17, the operation of 3D alignment is illustrated. If ch is equal to 'A' or 'a' at step 1711, ptSnap attempts to align with all previous points at step 727. FIGS. 21A–C illustrate this case arm. At step 2141, the user desires normal creation angles. Thus, the function gets the current point (nprev - 1) at step 2142 and sets the alignment angles equal to the normal creation angles in step 2143. However, if ch is not equal to 'a' at step 2141, then additional creation angles are preferred. Thus, the function gets the previous point (nprev) at step 2144 and sets the alignment angles equal to additional creation angles at step 2145.

A loop is established at step 2146 to examine all previous points up to nprev. At step 2147, the point is converted to screen coordinates, and at step 2148 it is converted to integer space to increase performance. At step 2149, the distance from the point to the probe is calculated. At step 2150, a second loop is established to examine all alignment lines. Steps 2151 and 2152 calculate the absolute value of the distance from the probe point to the alignment line. If in step 2153, this distance is within the hit radius and the number of objects has not exceeded the maximum number of objects, then the function constructs a line from the current alignment points to the past point (where the probe is at) in step 2154. This line is added to the inference object list in step 2155 by calling snapAddIObj.

At step 2156, if ch is equal to 'A', then the function determines alignment for the active points array. This array includes points in 3-D, i.e., ones having horizontal (x), vertical (y), and depth (z) components, such as endpoints, quadrant points, % points, vertex points, midpoints, and intersections, which the user touches. Step 2157 repeats the alignment-line determination for this array. The function concludes by returning or looping if additional points remain to be checked.

If ch is equal to 'b' at step 1711, ptSnap attempts to align with tangents and perpendiculars at step 1728. FIG. 21C illustrates this operation. At step 2161, the function returns if there are no previous points since a single point cannot be a tangent or a perpendicular. At step 2162, the local variable current point (curPt) is set equal to the previous point. At step 2163, the current and the screen points are converted to screen coordinates. At step 2164, a loop is established to check each tangent vector (tanvect). Step 2165 checks to determine if the limit of the object array is exceeded. In step 2166, if the distance to the tangent or perpendicular is within the hit radius, then that object is added to the inference object list by snapAddIObj at step 2167. The function concludes by returning or looping.

Figure 22:
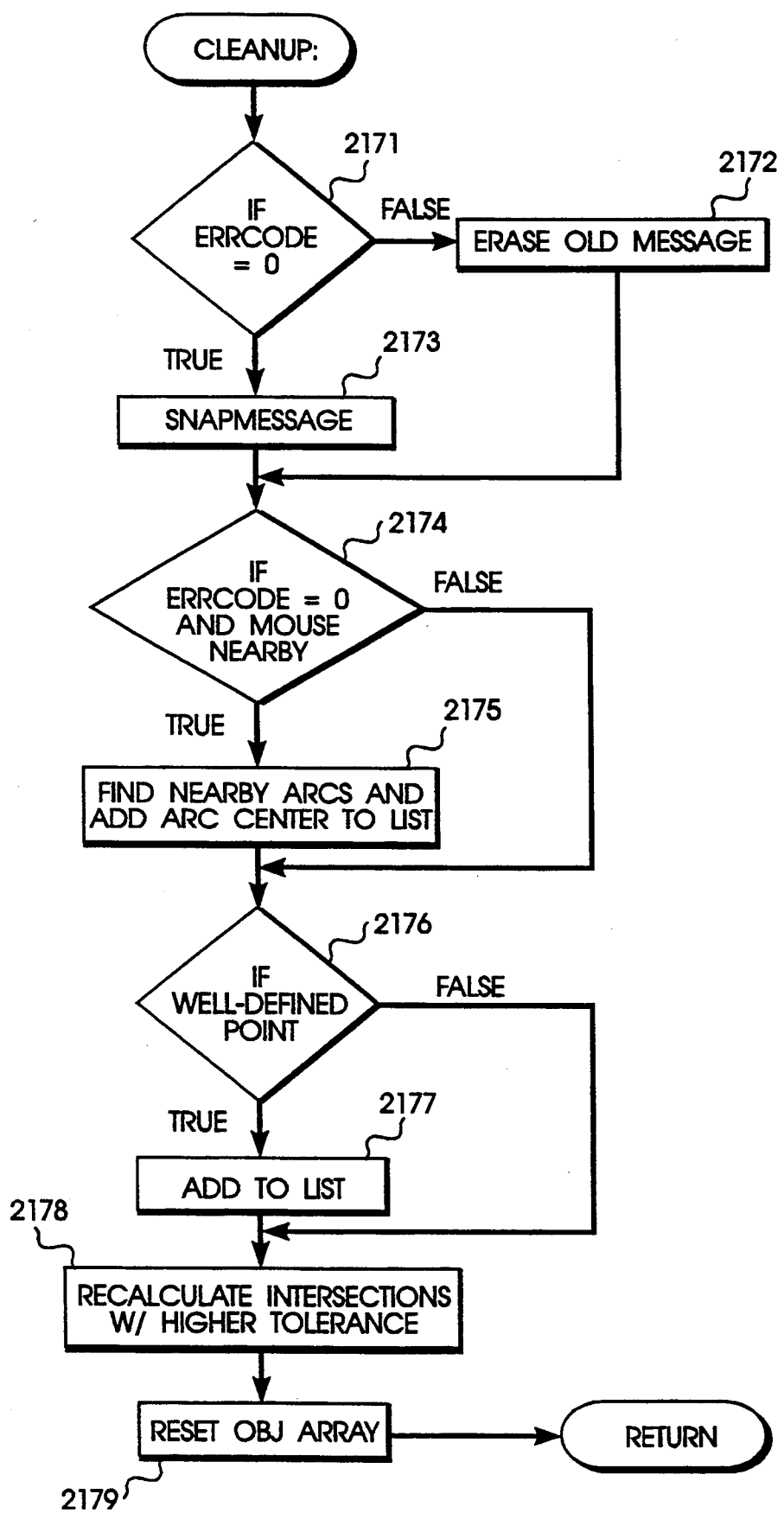
FIG. 22 is a flow diagram for the cleanup routine which may be called within or after the ptSnap function.

Once the case statement of step 1711 (FIG. 17) has finished, ptSnap goes to a cleanup routine. However, ptSnap may jump directly to cleanup from certain case arms, for example, null and freepoints. FIG. 22 illustrates the operation of cleanup. At step 2171, if there is no error, then snapMessage is called at step 2173. snapMessage looks up the appropriate screen message from a message table.

By way of illustration and not limitation, a message table may be constructed in C by the following declarations:

```
static char   *msgTbl[] = {
              "f",
              "ggrid",
              "iintersect",
              "eendpoint",
              "mmidpoint",
              "oon",
              "ttangent",
              "pperpendicular",
              "ccenter",
              "qquadrant",
              "vvertex",
              "aalign",
              "%%point",
              "Bbehind",
              "zzero",
              "0,
};
```

As described hereinabove, textual messages are not restricted to any particular natural language but instead may be translated into any desired language. Those skilled in the art will also appreciate that the screen messages may include any helpful indicia, including graphic messages such as icons.

If there is an error at step 2171, such as a "timeout," the old message is erased at step 2172 without calling snapMessage. Steps 2174 through 2177 add interesting points to the active points array. At step 2174, if there is no error and the mouse is nearby, then at step 2175 the function finds nearby arcs and adds their centers to the list. At steps 2176 and 2177, the function adds well-defined points to the list. At step 2178, any intersections found are recalculated at a higher tolerance. Finally, at step 2179, the object array is reset and the function returns.

While the invention is described in some detail with specific reference to a single preferred embodiment and certain alternatives, there is no intent to limit the invention to that particular embodiment or those specific alternatives. The true scope of the invention is defined not by the foregoing description but by the following claims.

What is claimed is:

1. In an interactive computer system having a display and a pointing device controlled by a user to specify a position, a method for automatically locating geometric points for the user comprising the steps of:
   displaying an object in a drawing area on the display;
   defining a type of point off the object that bears a particular relationship to a particular point on the object;
   setting a hit radius;
   receiving information from the pointing device representing a user-specified position;
   testing to determine whether a point of the defined type is within the hit radius of the user-specified position;
   if a point of the defined type is found within the hit radius of the user-specified position, then displaying in the drawing area a temporary construction line passing through the point of the defined type and the particular point on the object; and
   repeating the steps of receiving information, testing, and conditionally displaying a construction line for a plurality of user-specified positions.

2. The method of claim 1 wherein the pointing device is of a type controlled at a location remote from the display, and further comprising the step, performed in response to receiving information from the pointing device, of displaying a cursor on the display.

3. The method of claim 2 wherein the pointing device is a mouse.

4. The method of claim 1, and further comprising the step, performed if a point of the defined type is found within the hit radius of the user-specified position, of displaying in the drawing area a screen message indicating the nature of the point of the defined type.

5. The method of claim 4 wherein the screen message is text displayed near the particular point on the object.

6. The method of claim 4 wherein the screen message is text displayed near the user-specified position.

7. The method of claim 1, and further comprising the step, performed if a point of the defined type is found within the hit radius of the user-specified position, of displaying in the drawing area an indicator on the point of the defined type determined to be within the hit radius of the user-specified position.

8. The method of claim 1 wherein:
   the defined type is a point that if connected by a straight line to the particular point on the object would define a particular slope angle; and
   the temporary construction line is a construction line passing through the particular point and having the particular slope angle.

9. The method of claim 8 wherein the particular slope angle is 45 degrees.

10. The method of claim 1 wherein:
    the object comprises a line;
    the particular point is an endpoint of the line;
    the defined type is a point that if connected by a straight line to the endpoint of the line would define a particular slope angle; and
    the temporary construction line is a construction line passing through the endpoint and having the particular slope angle.

11. The method of claim 1 wherein:
    the object comprises a line;
    the particular point is an endpoint of the line;
    the defined type is a point having the same horizontal position as the endpoint of the line; and
    the temporary construction line is a vertical construction line passing through the endpoint.

12. The method of claim 1, and further comprising the step, performed if a point of the defined type is found within the hit radius of the user-specified position, of displaying in the drawing area a screen message indicating the nature of the point of the defined type.

13. The method of claim 12 wherein the screen message includes the text "align."

14. The method of claim 12 wherein the screen message includes text displayed near the endpoint.

15. The method of claim 12 wherein the screen message includes text displayed near the user-specified position.

16. The method of claim 12 wherein the screen message includes the text "align" displayed near the endpoint and the text "on" displayed near the user-specified position.

17. The method of claim 1 wherein:
    the object comprises a line;

the particular point is an endpoint of the line;

the defined type is a point having the same vertical position as an endpoint of the line; and the temporary construction line is a temporary horizontal construction line passing through the endpoint.

18. The method of claim 17, and further comprising the step, performed if a point of the defined type is found within the hit radius of the user-specified position, of displaying in the drawing area a screen message indicating the nature of the point of the defined type.

19. The method of claim 1 wherein:

the object comprises a line;

the defined type is a point having the same horizontal position as a first endpoint of the line and the same vertical position as a second endpoint of the line; and the step of displaying a temporary construction line comprises displaying in the drawing area a temporary vertical construction line passing through the first endpoint and further comprises displaying in the drawing area a temporary horizontal construction line passing through the second endpoint and intersecting the temporary vertical construction line.

20. The method of claim 19, and further comprising the step, performed if a point of the defined type is found within the hit radius of the user-specified position, of displaying in the drawing area a screen message indicating that the user-specified position is within the hit radius of the intersection of the temporary vertical and horizontal construction lines.

21. The method of claim 20 wherein the screen message includes the text "intersect."

22. The method of claim 20 wherein the screen message includes the text "intersect" displayed near the intersection of the temporary temporary vertical and horizontal construction lines.

23. The method of claim 1 wherein:

the object is a circle;

the particular point is a user-specified point on the circle;

the defined type is a point that if connected by a straight line to the user-specified point on the circle would define a tangent to the circle; and the temporary construction line is a temporary construction line passing through the user-specified point and tangent to the circle.

24. In an interactive computer system having a display and an input device controlled by a user to specify a position, a method for automatically locating geometric points for the user comprising the steps of:

displaying an object in a drawing area on the display;

defining a type of point off the object that bears a particular relationship to a particular point on the object;

setting a hit radius;

receiving position information from the input device and displaying a cursor at a corresponding position on the display in response thereto;

testing to determine whether a point of the defined type is within the hit radius of the cursor;

if a point of the defined type is found within the hit radius of the cursor, then displaying in the drawing area a temporary construction line passing through the point of the defined type and the particular point on the object; and repeating the steps of receiving position information, testing, and conditionally displaying a construction line for a plurality of positions.

25. The method of claim 24 wherein the input device is a pointing device controlled at a location remote from the display.

26. The method of claim 25 wherein the pointing device is a mouse.

27. The method of claim 24, and further comprising the step, performed if a point of the defined type is found within the hit radius of the cursor, of displaying in the drawing area a screen message indicating the nature of the point of the defined type.

28. The method of claim 27 wherein the screen message includes text displayed near the particular point.

29. The method of claim 27 wherein the screen message includes text displayed near the cursor.

30. The method of claim 24, and further comprising the step, performed if a point of the defined type is found within the hit radius of the cursor, of displaying in the drawing area a secondary cursor on the point of the defined type determined to be within the hit radius of the cursor.

31. In an interactive computer system having a display and an input device controlled by a user to specify a location, a method for automatically locating geometric points for the user comprising the steps of:

displaying an object in a drawing area on the display;

defining a type of point that bears a particular relationship to the object;

setting a hit radius;

displaying in the drawing area a cursor to indicate a location specified by the user;

testing to determine whether a point of the defined type is within the hit radius of the cursor;

if a point of the defined type is found within the hit radius of the cursor, then displaying in the drawing area a secondary cursor on the point of the defined type determined to be within the hit radius of the cursor; and repeating the steps of displaying a cursor, testing, and conditionally displaying a secondary cursor for a plurality of locations.

32. The method of claim 31, and further comprising the step, performed if a point of the defined type is found within the hit radius of the cursor, of displaying in the drawing area a screen message indicating the nature of the point of the defined type.

33. The method of claim 31 wherein:

the defined type is any point on the object; and the secondary cursor is displayed on the object.

34. The method of claim 33, and further comprising the step, performed if a point of the defined type is found within the hit radius of the cursor, of displaying in the drawing area a screen message indicating the nature of the point of the defined type.

35. The method of claim 34 wherein the screen message includes the text "on."

36. The method of claim 31 wherein:

the object comprises a line;

the defined type is an endpoint of the line; and the secondary cursor is displayed on the endpoint.

37. The method of claim 36, and further comprising the step, performed if a point of the defined type is found within the hit radius of the cursor, of displaying in the drawing area a screen message indicating that the cursor is within the hit radius of the endpoint.

38. The method of claim 37 wherein the screen message includes the text "endpoint."

39. The method of claim 37 wherein the screen message includes text displayed near the endpoint.

40. In an interactive computer system having a display and a pointing device controlled by a user to specify a position, a method for automatically locating geometric points for the user comprising the steps of:
displaying an object in a drawing area on the display;
defining a type of point that bears a particular relationship to the object;
setting a hit radius;
receiving information from the pointing device representing a user-specified position;
testing to determine whether a point of the defined type is within the hit radius of the user-specified position;
if a point of the defined type is found within the hit radius of the user-specified position, then (1) displaying in the drawing area an indication of the point of the defined type, and (2) displaying in the drawing area a screen message indicating the nature of the point of the defined type; and
repeating the steps of receiving information, testing, conditionally displaying an indication, and conditionally displaying a screen message for a plurality of user-specified positions.

41. In an interactive computer system having a display and a pointing device controlled by a user to specify a position, a method for automatically locating geometric points for the user comprising the steps of:
displaying a two-dimensional representation of a three-dimensional object in a drawing area on the display;
defining a type of point off the object that bears a particular relationship to a particular point on the object;
setting a hit radius;
receiving information from the pointing device representing a user-specified position;
testing to determine whether a point of the defined type is within the hit radius of the user-specified position;
if a point of the defined type is found within the hit radius of the user-specified position, then displaying in the drawing area a two-dimensional representation of a temporary construction line passing through the point of the defined type and the particular point on the object; and
repeating the steps of receiving information, testing, and conditionally displaying a construction line for a plurality of user-specified positions.

42. The method of claim 41 wherein:
the defined type is a point that if connected by a straight line to the particular point on the object would define a line that is parallel to a particular coordinate axis; and
the temporary construction line is a temporary construction line parallel to the particular coordinate axis.

43. In an interactive computer system having a two-dimensional display and a pointing device controlled by a user to specify a position, a method for automatically locating geometric points for the user comprising the steps of:
displaying a two-dimensional representation of a three-dimensional object in a drawing area on the display wherein the two-dimensional representation contains intersections displayed between portions of objects which do not exist in three dimensions, these intersections being referred to as visual intersections;
setting a hit radius;
receiving information from the pointing device representing a user-specified position;
testing to determine whether a visual intersection is within the hit radius of the user-specified position;
if a visual intersection is found within the hit radius of the cursor, then displaying in the drawing area a secondary cursor on the visual intersection determined to be within the hit radius of the cursor; and
repeating the steps of receiving information, testing, and conditionally displaying a secondary cursor for a plurality of user-specified positions.

44. The method of claim 43, and further comprising the step, performed if a point of the defined type is found within the hit radius of the user-specified position, of displaying in the drawing area a screen message indicating the nature of the point of the defined type.

45. The method of claim 43 wherein the screen message includes the text "behind."

46. The method of claim 43 wherein the screen message includes the text "front."

47. A method that enables the user of a computer responsive to a cursor-control device to automatically locate, in at least one dimension, geometric points in relation to at least one object illustrated on a screen, comprising the steps of:
(a) determining a cursor location by user manipulation of the cursor-control device, the cursor location including a hit area thereabout;
(b) testing an object to find at least one geometric point within the hit area as the cursor location is manipulated with respect to the object;
(c) automatically providing an indication on the screen that a geometric point has been found if a geometric point is within the hit area and is a geometric point of the object; and
(d) automatically displaying on the screen at least one temporary construction that indicates the location of a geometric point and the geometric relationship thereof to the object when a geometric point is within the hit area and is not a geometric point of the object.

48. The method as defined in claim 47 wherein step d), the at least one temporary construction is a temporary construction line displayed between the object and the indicated location of the geometric point.

49. The method as defined in claim 48 wherein step (d) further includes:
automatically displaying alphabetical indicia adjacent the indicated location of the geometric point that indicate the relationship of the geometric point to the object.

50. The method as defined in claim 48 wherein step (d) further includes:
automatically displaying indicia adjacent the object and the at least one temporary construction line that indicate a relationship of the geometric point to the object.

51. The method as defined in claim 48 wherein step (d) further includes:
displaying a first text screen message adjacent the indicated location of the geometric point; and
displaying a second text screen message adjacent the at least one temporary construction line and the object, the first and second text screen messages indicating the relationship of the geometric point to the object.

52. The method as defined in claim 47 wherein step (d) further includes:
automatically displaying a first text screen message adjacent the indicated location of the geometric point; and
automatically displaying a second text screen message adjacent the at least one temporary construction and the object, the first and second text screen messages indicating the relationship of the geometric point to the object and being selected from a set comprised of:
"grid";
"intersect";
"endpoint";
"midpoint";
"on";
"tangent";
"perpendicular";
"center";
"quadrant";
"v.p.";
"vertex";
"align"; and
"% point".

53. The method as defined in claim 47 wherein step (c) is performed by:
automatically displaying indicia adjacent the indicated location of the geometric point that indicate the relationship of the geometric point to the object.

54. The method as defined in claim 47 wherein the object includes a curve and where in step (d) the at least one temporary construction is at least one temporary construction line, where step (c) further includes:
selecting a reference geometric point on the curve with the cursor-control device; and where step (d) further includes:
automatically displaying the at least one temporary construction line as a tangent to the curve at the reference geometric point when the cursor location is manipulated so that the temporary construction tangent line through the reference geometric point is within the hit area.

55. The method as defined in claim 47 wherein a second object is displayed on the screen, wherein the first object includes a curve, and where in step (d) the at least one temporary construction is at least one temporary construction line, where step (c) further includes:
selecting a reference geometric point on the curve with the cursor-control device; and where step (d) further includes:
automatically displaying the at least one temporary construction line tangent to the curve at the reference point when the cursor location is manipulated so that the temporary construction tangent line through the reference geometric point is within the hit area, and the further steps of:
(e) manipulating the cursor location adjacent the second object while the temporary construction tangent line is displayed; and
(f) automatically displaying an indication of any intersection between the at least one temporary construction tangent line and a geometric point related to the second object within the hit area.

56. The method as defined in claim 47 wherein a second object is displayed on the screen, including the further step of:
(e) selecting at least one constraining angle, and wherein step (b) further includes:
selecting a reference geometric point of the first object with the cursor-control device; and wherein step (e) further includes:
automatically displaying a temporary construction line from the reference geometric point when the cursor location is manipulated so a line at at least one constraining angle through the reference geometric point is within the hit area; and
manipulating the cursor location adjacent the second object while the temporary construction line is displayed to indicate the location of a geometric point at an intersection between the temporary construction line and the second object that is within the hit area.

57. The method as defined in claim 47 including the additional step of defining a set of geometric points from a set comprising:
freepoints;
grid points;
intersection points;
endpoints;
midpoints;
points on objects;
tangent points;
perpendicular points;
center points;
quadrant points;
vertex points;
vanishing points;
align points; and
percent points.

58. The method as defined in claim 47 here if a plurality of geometric points are within the hit area:
automatically providing an indication on the display of the location of the geometric point that is closest to the cursor location.

59. The method as defined in claim 47 where the indication of the location of the geometric point is accomplished by: displaying a primary cursor symbol to indicate the cursor location with respect to the object; and:
displaying a secondary cursor symbol to indicate the location of the geometric point with respect to the object.

60. The method as defined in claim 47 including the additional steps of:
choosing to automatically locate geometric points; and
repeating steps (b), (c) and (d).

61. The method as defined in claim 47 where in step (d), the at least one temporary construction is a temporary construction line displayed between the object and the indicated location of the geometric point, said method including the additional step of:
(e) if a second temporary construction line is displayed between the object and the indicated location of the geometric point in the hit area, displaying indicia adjacent the second temporary construction line and the object to indicate the relationship of the second temporary construction line to the object.

62. The method as defined in claim 61 where the second temporary construction line is either:
   an extension of an arc; or
   a straight line.

63. A method for automatically locating, in at least one dimension, interesting geometric points defined in relative distances to a line drawing displayed as a pixel bit map on a screen that is divided into pixels for a user of a computer-aided drafting system, the system being controlled at least in part by the user's manipulation of a cursor-control device, comprising the steps of:
   (a) defining a cursor probe as a location responsive to manipulation of the cursor-control device by the user;
   (b) automatically displaying a cursor symbol on the screen to indicate location to the cursor probe with respect to the line drawing;
   (c) defining a hit area that includes the cursor probe;
   (d) defining geometric points that are interesting;
   (e) defining geometry from the line drawing that is interesting;
   (f) automatically testing the line drawing to find at least one interesting geometric point within the hit area as the cursor probe relocated;
   (g) automatically providing an indication on the display that an interesting geometric point has been found if an interesting geometric point is found within the hit area;
   (h) automatically creating construction lines from the line drawing in accordance with the geometry defined as interesting if an interesting geometric point is not found within the hit area in step (f);
   (i) automatically testing the construction lines and the line drawing to find at least one interesting geometric point;
   (j) automatically providing an indication on the display that an interesting geometric point has been found in step (i); and
   (k) automatically displaying a construction line on the screen that indicates the location of a construction line intersecting the found interesting geometric point if an interesting geometric point is found within the hit area in step (i).

64. The method as defined in claim 63 wherein any automatic indication on the display that an interesting geometric point has been found includes:
   displaying a secondary cursor symbol, the location of the found interesting geometric point with respect to the displayed line drawing being indicated by the secondary cursor symbol.

65. The method as defined in claim 63 wherein steps (f) and (i) include:
   determining if more than one interesting geometric point has been found; and
   determining which found interesting geometric point is closest to the cursor probe; and in steps (g) and (j):
      automatically providing an indication on the display of only the found interesting geometric point that has been determined to be closest to the cursor probe.

66. The method as defined in claim 63 herein the construction lines created in step (h) are:
   temporary extensions of arcs of the line drawing; and
   temporary straight lines, the location of any such construction line with respect to the line drawing being displayed on the screen with a different line appearance than the appearance of the line drawing to indicate to the user the temporary character thereof, further including the step of:
   (1) erasing all temporary extensions of arcs of the line drawing and temporary straight lines if an interesting geometric point thereon is no longer in the hit area.

67. The method as defined in claim 63 including the additional step of:
   reducing any containers of the line drawing to line and arc primitives prior to step (f).

68. The method as defined in claim 63 including the additional steps of:
   selecting portions of the line drawing; and
   masking the selected portions so that the location of interesting geometric points thereof and construction lines constructable therefrom are not indicated on the screen.

69. The method as defined in claim 63 here in steps (g) and (j) the indication that an interesting geometric point has been found includes:
   displaying alphabetical indicia near the indicated location of the found interesting geometric point that indicate the relationship of the found interesting geometric point to the line drawing.

70. A method for a user of a computer-aided drafting system to automatically locate, in at least one dimension, interesting geometric points to a precision of less than one pixel in relation to a line drawing represented as a pixel bit map on a screen that is divided into pixels, the system being controlled at least in part by the user's manipulation of a cursor-control device, comprising the steps of:
   (a) determining the location of a cursor probe with respect to the line drawing by user manipulation of the cursor-control device;
   (b) defining a hit area that moves with and includes the cursor probe;
   (c) defining geometric points that are interesting;
   (d) defining geometry from the line drawing that is interesting;
   (e) automatically constructing construction lines from the line drawing in accordance with the geometry defined as interesting;
   (f) automatically testing the construction lines and the line drawing to find at least one interesting geometric point within the hit area as the cursor probe is moved to different locations;
   (g) automatically providing an indication on the screen that an interesting geometric point has been found; and
   (h) automatically displaying a temporary line indicating on the screen the location with respect to the line drawing of any construction line intersecting the found interesting geometric point within the hit area.

71. A method for automatically locating, in at least one dimension, interesting geometric points to a precision of less than one pixel in relation to a line drawing displayed on a screen divided into pixels for a user of a computer-aided drafting system, the system being controlled at least in part by the user's manipulation of a cursor-control device, comprising the steps of:
   (a) determining the location of a cursor probe with respect to the line drawing by user manipulation of the cursor-control device;

(b) displaying a cursor symbol on the screen at a location indicative of the location of the cursor probe with respect to the line drawing;
(c) defining a hit area that moves with and includes the cursor probe;
(d) automatically testing to find at least one interesting geometric point within the hit area as the cursor probe is manipulated to different locations;
(e) automatically providing an indication on the display that an interesting geometric point has been found if an interesting geometric point is found within the hit area; and
(f) automatically displaying at least one temporary construction line extending at least partially between the line drawing and the pixel containing the found interesting geometric point when the found interesting geometric point is spaced from the line drawing.

72. The method as defined in claim 71 where in step (f), the temporary construction lines include straight lines and arcuate lines, and where in step (c) the hit area is defined by:
selecting a radius of an integer number of pixels from the cursor probe.

73. The method as defined in claim 71 herein step (f) further includes:
automatically displaying alphabetical indicia closely spaced from the pixel containing the interesting geometric point that indicate the relationship of the interesting geometric point to the line drawing.

74. The method as defined in claim 71 wherein step (f) further includes:
automatically displaying indicia closely spaced from the line drawing and the displayed at least one temporary construction line that indicate a relationship of the displayed at least one temporary construction line to the line drawing.

75. The method as defined in claim 71 where in step (f), the displayed temporary construction line extends from an interesting geometric point on the line drawing and wherein step (f) further includes:
automatically displaying a first text screen message adjacent the found interesting geometric point; and
automatically displaying a second text screen message adjacent the interesting geometric point on the line drawing, the first and second text screen messages indicating the relationship of the interesting geometric points to the line drawing.

76. The method as defined in claim 71 where in step (f), the displayed temporary construction line extends from an interesting geometric point of the line drawing and wherein step (f) further includes:
automatically displaying a first text screen message adjacent the found interesting geometric point; and
automatically displaying a second text screen message adjacent the interesting geometric point of the line drawing, the first and second text screen messages indicating the relationship of the interesting geometric points to the line drawing, the text screen messages being selected from a set comprised of:
"grid";
"intersect";
"endpoint";
"midpoint";
"on";
"tangent";
"perpendicular";
"center";
"quadrant";
"v.p.";
"vertex";
"align"; and
"% point".

77. The method as defined in claim 71 wherein the line drawing includes a curved line and wherein the automatic display of the at least one temporary construction line in step (f) displays a straight construction line and is performed by:
identifying an interesting geometric point on the curved line with the cursor-control device; and
automatically displaying the at least one temporary construction line tangent to the curved line at the identified interesting geometric point when the cursor probe is manipulated so that the at least one temporary construction tangent line through the identified interesting geometric point is within the hit area of the cursor probe.

78. The method as defined in claim 71 wherein first and second line drawings are present, wherein the first line drawing includes a curved line, and wherein the automatic display of the at least one temporary construction line in step (f) displays a straight line and is performed by:
identifying an interesting geometric point on the curved line with the cursor-control device; and
automatically displaying the at least one temporary construction line tangent to the curved line at the identified interesting geometric point when the cursor probe is manipulated so that the at least one temporary construction tangent line from the identified interesting geometric point is within the hit area of the cursor probe, and the further steps of:
(g) manipulating the cursor probe adjacent the second line drawing while the at least one temporary construction tangent line is displayed; and
(h) automatically displaying an indication of any intersection between the at least one temporary construction tangent line and an interesting geometric point of the second line drawing.

79. The method as defined in claim 71 including the further steps of:
(g) choosing at least one constraining angle, wherein first and second line drawings are displayed, and wherein the automatic display of the at least one temporary construction line in step (f) is performed by:
identifying an interesting geometric point on the first line drawing with the cursor-control device; and
automatically displaying a temporary construction line from the identified geometric point when the cursor probe is manipulated so a line at the at least one constraining angle through the identified geometric point is within the hit area of the cursor probe; and
(h) manipulating the cursor probe while the temporary construction line is displayed adjacent the second line drawing so that the interesting geometric point automatically displayed is the intersection between the temporary construction line and an interesting geometric point of the second line drawing.

80. The method as defined in claim 71 wherein the interesting geometric points are chosen from a set comprised of:
freepoints;
grid points;
intersection points;
endpoints;
midpoints;
points on line drawings;
tangent points;
perpendicular points;
center points;
quadrant points;
vertex points;
vanishing points;
align points; and
percentage points.

81. The method as defined in claim 71 where in step (d) automatically providing an indication on the screen of the location of the found interesting geometric point with respect to the line drawing that is closest to the cursor probe if more than one interesting geometric point is found within the hit area.

82. The method as defined in claim 81 where in during step (d) if an indication on the display of the location of the interesting geometric point with respect to the line drawing that is closest to the displayed position of the cursor probe is being displayed, displaying a secondary cursor symbol to indicate the location of the closest interesting geometric point.

83. The method as defined in claim 71 including the additional step of:
(g) displaying indicia adjacent the temporary construction line and the line drawing if a temporary construction line is displayed between the line drawing and the interesting geometric point.

84. The method as defined in claim 71 including the additional step of:
(g) displaying indicia adjacent a second temporary construction line and the line drawing if the second temporary construction line is displayed between the line drawing and the found interesting geometric point.

85. The method as defined in claim 71 including the additional step of:
(g) choosing a constraint angle for the temporary construction line before the temporary construction line is displayed.

86. A method for automatically locating interesting geometric points to a precision of less than one pixel in relation to a full scale line drawing displayed on a screen divided into pixels for a user of a computer-aided drafting system, the system being controlled at least in part by the user's manipulation of a cursor-control device, comprising the steps of:
(a) displaying a cursor symbol on the screen whose location on the screen is determined by manipulation of the cursor-control device by the user, the cursor symbol having a related probe and indicating the mathematical location of the probe, the probe having a probe hit area thereabout;
(b) automatically testing the lines of the drawing to find at least one interesting geometric point within the probe hit area as the cursor symbol is manipulated between pixels;
(c) automatically displaying alphabetical indicia near the pixel in which the found interesting geometric point is located that indicate the relationship of the found interesting geometric point to the line drawing if an interesting geometric point is found within the probe hit area.

87. A method for automatically locating interesting geometric points in relation to straight lines and arcs of a drawing displayed on a display of a computer for a user, the computer being controlled at least in part by the user's manipulation of a cursor-control device, comprising the steps of:
(a) automatically displaying a cursor point on the display whose location on the display is determined by manipulation of the cursor-control device by the user;
(b) defining a hit area that includes the cursor point;
(c) automatically testing the straight lines and arcs of the drawing to find a interesting geometric point within the hit area as the cursor-control is manipulated to move the location of the cursor point on the display;
(d) automatically providing an indication on the display of the location of the found interesting geometric point with respect to the straight lines and arcs of the drawing if an interesting geometric point is found within the hit area; and
(e) automatically displaying at least one temporary construction on the display that indicates the geometric relationship of the found interesting geometric point to the drawing if the found interesting geometric point is not on a straight line, arc, or arc center of the drawing.

88. The method of claim 87 including the additional steps of:
(f) automatically displaying indicia adjacent the interesting geometric point that indicate the relationship of the interesting geometric point to the drawing; and
(g) limiting temporary constructions from arc centers to those that have recently been within the hit area.

89. A method for automatically locating interesting geometric points in relation to at least one line drawing displayed on a screen for a user of a computer-aided drafting system, the system being controlled at least in part by the user's manipulation of a cursor-control device, comprising the steps of:
(a) automatically displaying a cursor symbol on the screen whose location on the screen is determined by manipulation of the cursor-control device by the user, the cursor symbol including a hit area thereabout;
(b) automatically testing to find at least one interesting geometric point within the hit area of the cursor symbol as the cursor symbol is manipulated;
(c) automatically providing an indication on the screen of the location of the first interesting geometric point if a first interesting geometric point is found within the hit area;
(d) automatically displaying a first construction that indicates a geometric relationship of the first interesting geometric point as the cursor symbol is further manipulated;
(e) automatically testing to find a second interesting geometric point within the hit area of the cursor symbol related to the first construction as the cursor symbol is further manipulated;
(f) automatically providing an indication on the screen of the location of the second interesting geometric point if a second interesting geometric point is found within the hit area;

(g) automatically displaying a second construction line that indicates a geometric relationship of the second interesting geometric point;
(h) choosing the second interesting geometric point with the cursor-control device; and
(i) automatically erasing the first and second constructions.

90. A method for automatically locating interesting geometric points in relation to a line drawing displayed on a screen for a user of a computer-aided drafting system, the system being controlled at least in part by the user's manipulation of a cursor-control device, comprising the steps of:
(a) automatically displaying a cursor on the screen whose location on the screen is determined by manipulation of the cursor-control device by the user, the cursor including a hit area related thereto;
(b) automatically testing to find at least one interesting geometric point within the hit area as the cursor is manipulated;
(c) automatically providing an indication on the screen of the location of the first interesting geometric point with respect to the line drawing if a first interesting geometric point is found within the hit area;
(d) automatically displaying a first construction indicia that indicates a geometric relationship of the first interesting geometric point to the line drawing;
(e) automatically testing to find a second interesting geometric point within the hit area related to the first construction indicia as the cursor is further manipulated;
(f) automatically providing an indication on the screen of the location of the second interesting geometric point if a second interesting geometric point is found within the hit area;
(g) automatically displaying a second construction line that indicates a geometric relationship of the second interesting geometric point to the line drawing;
(h) choosing the second interesting geometric point with the cursor-control device; and
(i) automatically erasing the first and second construction lines.

91. A method for automatically locating, in at least one dimension, the endpoints of a line at interesting geometric points to a precision of less than one pixel in relation to a precise line drawing represented essentially full scale as a pixel bit map on a screen that is divided into pixels for a user of a computer-aided drafting system, the system being controlled at least in part by the user's manipulation of a cursor-control device, comprising the steps of:
(a) displaying a cursor symbol on the screen, the cursor symbol having a cursor pixel, the location of the cursor pixel on the screen moving in accordance with manipulation of the cursor-control device by the user;
(b) defining a hit area that moves with and includes the area of the cursor pixel;
(c) defining geometric points that are interesting;
(d) defining geometry from the precise line drawing that is interesting;
(e) choosing to draw a line;
(f) manipulating the cursor-control device to move the cursor pixel;
(g) automatically testing the precise line drawing to find at least one interesting geometric point within the hit area as the cursor pixel is moved to different screen locations;
(h) automatically providing an indication on the screen that an interesting geometric point has been found if an interesting geometric point is found within the hit area;
(i) automatically constructing construction lines from the line drawing in accordance with the geometry defined as interesting if an interesting geometric point is not found within the hit area;
(j) automatically testing the construction lines and the line drawing to find at least one interesting geometric point;
(k) automatically providing an indication on the screen that an interesting geometric point has been found and automatically displaying any construction line intersecting the found interesting point if an interesting geometric point is found within the hit area;
(l) choosing a first interesting geometric point as the starting point of the line by means of a user manual input;
(m) manipulating the cursor-control device to move the cursor pixel;
(n) automatically testing the line drawing to find at least one second interesting geometric point within the hit area as the cursor pixel is moved to different screen locations;
(o) automatically providing an indication on the screen that a second interesting geometric point has been found if a second interesting geometric point is found within the hit area;
(p) automatically constructing construction lines from the line drawing in accordance with the geometry defined as interesting if a second interesting geometric point is not found within the hit area;
(q) automatically testing the construction lines and the line drawing to find at least one second interesting geometric point;
(r) automatically providing an indication on the screen that a second interesting geometric point has been found and automatically displaying any construction line intersecting the found second interesting point if a second interesting geometric point is found within the hit area;
(s) choosing the second interesting geometric point as the finishing point of the line by means of a user manual input;
(t) automatically displaying the line between the first and second chosen interesting geometric points; and
(u) automatically erasing any construction lines.

92. A method for automatically locating, in at least one dimension, an interesting point of an object to a precision of less than one pixel in relation to a precise line drawing represented essentially full scale as a pixel bit map on a screen that is divided into pixels for a user of a computer-aided drafting system, the system being controlled at least in part by the user's manipulation of a cursor-control device, comprising the steps of:
(a) displaying a cursor symbol on the screen, the cursor symbol having a cursor pixel, the location of the cursor pixel on the screen moving in accordance with manipulation of the cursor-control device by the user;

(b) defining a hit area of pixels that moves with and includes the cursor pixel;

(c) defining geometric points that are interesting;

(d) defining geometry from the line drawing that is interesting;

(e) choosing to draw a line;

(f) manipulating the cursor-control device to move the cursor pixel adjacent the object;

(g) automatically testing the object to find at least one interesting geometric point within the hit area as the cursor pixel is moved to different screen locations;

(h) when an interesting geometric point of the object is found within the hit area, then automatically providing an indication on the screen that an interesting geometric point has been found;

(i) choosing a first interesting geometric point of the object by means of a user manual input;

(j) manipulating the cursor-control device to move the cursor pixel and drag the object by the first interesting geometric point therewith;

(k) as the cursor pixel is moved to different screen locations, automatically testing the line drawing to find at least one interesting geometric point within the hit area;

(l) if an interesting geometric point is found within the hit area, then automatically providing an indication on the screen that a second interesting geometric point has been found;

(m) if a second interesting geometric point is not found within the hit area, then automatically constructing construction lines from the line drawing in accordance with the geometry defined as interesting;

(n) automatically testing the construction lines and the object to find at least one second interesting geometric point;

(o) if a second interesting geometric point is found within the hit area, then automatically providing an indication on the screen that a second interesting geometric point has been found and automatically displaying any construction line intersecting the found second interesting geometric point;

(p) choosing a second interesting geometric point as the point to which the first interesting geometric point of the object is dragged by means of a user manipulation of the cursor-control; and (q) automatically displaying the object at a location as determined by the coincident location of the first and second interesting geometric points.

93. A graphical interface software program that when installed in a computer system enables a user to automatically locate, in at least a first dimension, an interesting point in relation to a precise line drawing represented as a pixel bit map on a screen of the computer system that is divided into pixels for a user that can be controlled at least in part by the user's manipulation of a cursor-control device of the computer system, including:

(a) means defining a cursor pixel;

(b) means for producing movement of the cursor pixel on the screen in accordance with manipulation of the cursor-control device by the user;

(c) means for calculating a hit area that moves with and includes the cursor pixel;

(d) means for defining types of geometric points that are interesting;

(e) means for defining interesting geometry of the line drawing;

(f) means for automatically testing the line drawing to find at least one interesting geometric point of a defined type within the hit area;

(g) means for automatically providing an indication on the screen when an interesting geometric point has been found;

(h) means for automatically constructing construction lines having the defined interesting geometry from the line drawing when an interesting geometric point is not found within the hit area on the line drawing;

(i) means for automatically testing the construction lines and the line drawing to find at least one interesting geometric point; and (j) means for automatically providing an indication on the screen when an interesting geometric point has been found and for automatically displaying any automatically constructed construction line intersecting the found interesting point when an interesting geometric point is found within the hit area.

94. A method for automatically locating, in at least one dimension, interesting geometric points in relation to a drawing for a user of a computer-aided drafting system, the system being controlled at least in part by the user's manipulation of a cursor-control device, comprising the steps of:

(a) locating a cursor probe that moves in accordance with manipulation of the cursor-control device by the user;

(b) defining a hit area that moves with and includes the cursor probe;

(c) defining geometric points that are interesting;

(d) defining geometry of the drawing that is interesting;

(e) automatically constructing construction lines from the drawing in accordance with the geometry defined as interesting; and (f) as the cursor probe is moved to different locations, automatically testing the construction lines and the drawing to find at least one interesting geometric point.

* * * * *